United States Patent
Shellhammer et al.

(10) Patent No.: US 12,244,417 B2
(45) Date of Patent: Mar. 4, 2025

(54) LINK ADAPTATION PROTOCOL IN A WIRELESS LOCAL AREA NETWORK (WLAN)

(71) Applicant: QUALCOMM Incorporated, San Diego, CA (US)

(72) Inventors: Stephen Jay Shellhammer, Ramona, CA (US); Sameer Vermani, San Diego, CA (US); Lin Yang, San Diego, CA (US); Jialing Li Chen, San Diego, CA (US); Dung Ngoc Doan, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 17/121,642

(22) Filed: Dec. 14, 2020

(65) Prior Publication Data

US 2021/0194629 A1  Jun. 24, 2021

Related U.S. Application Data

(60) Provisional application No. 62/952,216, filed on Dec. 20, 2019.

(51) Int. Cl.
*H04L 1/00* (2006.01)
*H04B 7/0452* (2017.01)
(Continued)

(52) U.S. Cl.
CPC ......... *H04L 1/0068* (2013.01); *H04B 7/0452* (2013.01); *H04B 7/0617* (2013.01);
(Continued)

(58) Field of Classification Search
CPC .................................................... H04W 84/12
See application file for complete search history.

(56) References Cited

U.S. PATENT DOCUMENTS

| 7,110,762 B1 | 9/2006 | Cameron et al. |
| 2003/0147415 A1* | 8/2003 | Dore ............... H04L 1/0083 370/445 |

(Continued)

FOREIGN PATENT DOCUMENTS

| CN | 107615693 A | 1/2018 |
| TW | 201743576 A | 12/2017 |

(Continued)

OTHER PUBLICATIONS

"PCT Application No. PCT/US2020/065133 International Search Report and Written Opinion", Mar. 26, 2021, 12 pages.
Taiwan Search Report—TW109144480—TIPO—Jan. 16, 2024.

*Primary Examiner* — Alpus Hsu
*Assistant Examiner* — Camquyen Thai
(74) *Attorney, Agent, or Firm* — Holland & Hart / QUALCOMM Incorporated

(57) ABSTRACT

This disclosure provides systems, methods, and apparatus, including computer programs encoded on computer-readable media, for a link adaptation protocol in a wireless local area network (WLAN). In one aspect, the link adaptation protocol may be used to select a transmission rate option (such as a modulation and coding scheme (MCS)) for communications from a first WLAN device to a second WLAN device based on wireless channel conditions. This disclosure includes several example message sequences for the link adaptation protocol which can accommodate a variety of uplink or downlink data transmission designs, including single user (SU) and multi-user (MU) transmissions. The example message sequences may be used with (Continued)

orthogonal frequency division multiple access (OFDMA), multiple-input-multiple-output (MIMO), and beamformed transmissions.

30 Claims, 24 Drawing Sheets

(51) Int. Cl.
    *H04B 7/06*     (2006.01)
    *H04W 24/10*     (2009.01)
    *H04W 84/12*     (2009.01)

(52) U.S. Cl.
    CPC ........... *H04L 1/0003* (2013.01); *H04W 24/10* (2013.01); *H04W 84/12* (2013.01)

(56) References Cited

U.S. PATENT DOCUMENTS

| | | | | |
|---|---|---|---|---|
| 2006/0105724 A1* | 5/2006 | Nakao | ................... | H04L 1/0002 455/115.1 |
| 2006/0203765 A1 | 9/2006 | Laroia et al. | | |
| 2006/0203772 A1* | 9/2006 | Laroia | ................... | H04W 28/22 370/329 |
| 2009/0170509 A1* | 7/2009 | Cai | ....................... | H04L 1/0029 455/434 |
| 2010/0172425 A1 | 7/2010 | Pare, Jr. et al. | | |
| 2013/0010632 A1 | 1/2013 | Wang et al. | | |
| 2013/0010634 A1* | 1/2013 | Lim | ....................... | H04L 1/0026 370/252 |
| 2013/0188630 A1* | 7/2013 | Song | ..................... | H04W 84/12 370/338 |
| 2016/0205011 A1* | 7/2016 | Yang | ....................... | H04L 43/50 370/252 |
| 2016/0242233 A1* | 8/2016 | Kang | .................... | H04L 1/0003 |
| 2016/0261327 A1 | 9/2016 | Merlin et al. | | |
| 2016/0352454 A1 | 12/2016 | Zhang et al. | | |
| 2017/0034845 A1* | 2/2017 | Liu | .................... | H04W 72/1268 |
| 2017/0064568 A1* | 3/2017 | Elsherif | ............. | H04L 25/0222 |
| 2018/0279337 A1* | 9/2018 | Kwon | ..................... | H04L 27/34 |
| 2018/0337709 A1 | 11/2018 | Zou et al. | | |
| 2019/0028230 A1 | 1/2019 | Dabbagh et al. | | |
| 2019/0159220 A1 | 5/2019 | Elsherif et al. | | |
| 2019/0289481 A1* | 9/2019 | Qvarfordt | ............. | H04W 24/08 |
| 2019/0289632 A1 | 9/2019 | Lou et al. | | |
| 2019/0327626 A1* | 10/2019 | Zhang | ................... | H04L 5/0048 |
| 2020/0145126 A1* | 5/2020 | Nammi | ................. | H04L 1/0009 |

FOREIGN PATENT DOCUMENTS

| WO | WO-2012047067 A2 * | 4/2012 | ........... H04L 1/1671 |
|---|---|---|---|
| WO | 2021126860 | 6/2021 | |

* cited by examiner

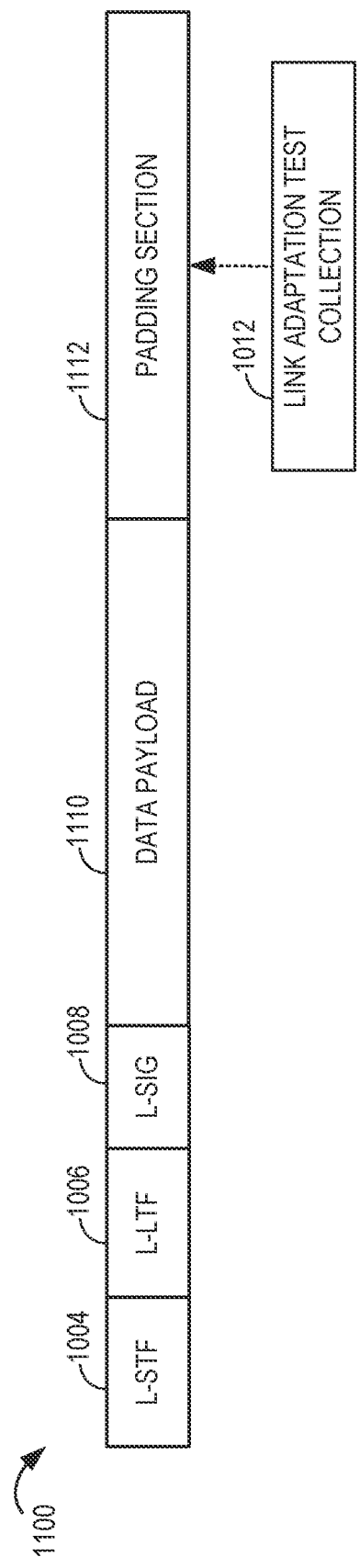
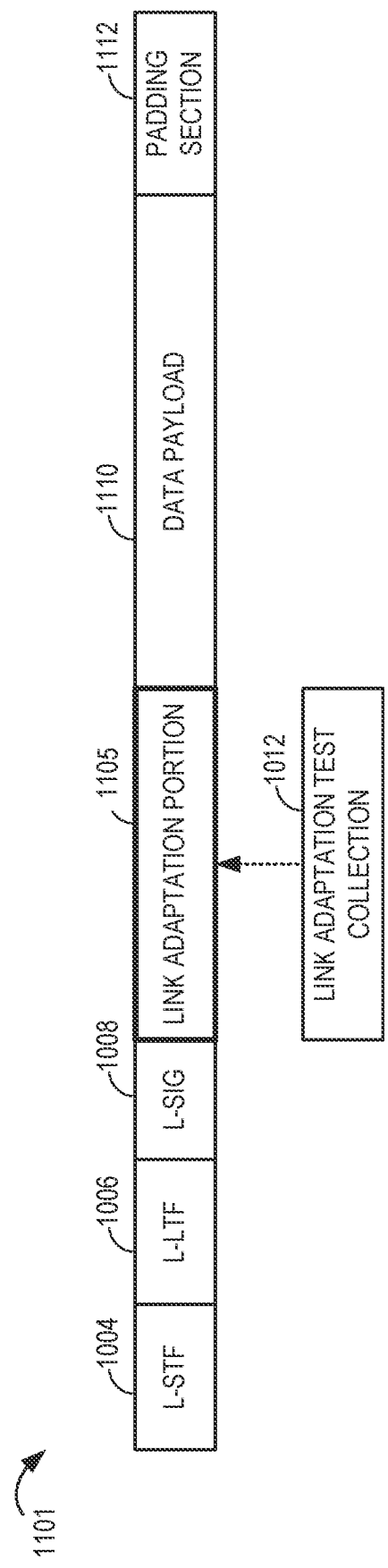

2200

2210 — RECEIVE A LINK ADAPTATION TEST PACKET FROM AN ACCESS POINT (AP) OF THE WLAN VIA A WIRELESS CHANNEL, THE LINK ADAPTATION TEST PACKET INCLUDING ONE OR MORE TEST PORTIONS FORMATTED TO AID MEASUREMENT OF LINK QUALITY METRICS ASSOCIATED WITH DIFFERENT TRANSMISSION RATE OPTIONS OF THE WIRELESS CHANNEL

2220 — MEASURE THE LINK QUALITY METRICS ASSOCIATED WITH THE DIFFERENT TRANSMISSION RATE OPTIONS BASED ON THE LINK ADAPTATION TEST PACKET

2230 — TRANSMIT LINK ADAPTATION FEEDBACK TO THE AP BASED, AT LEAST IN PART, ON THE LINK QUALITY METRICS

2240 — RECEIVE A SUBSEQUENT PACKET FORMATTED ACCORDING TO A TRANSMISSION RATE OPTION SELECTED BY THE AP BASED ON THE LINK ADAPTATION FEEDBACK.

*FIGURE 22*

LINK ADAPTATION PROTOCOL IN A WIRELESS LOCAL AREA NETWORK (WLAN)

CROSS-REFERENCE TO RELATED APPLICATIONS

This Patent Application claims priority to U.S. Provisional Patent Application No. 62/952,216, filed Dec. 20, 2019, entitled "FAST RATE ADAPTATION (FRA) IN A WIRELESS LOCAL AREA NETWORK (WLAN)," and assigned to the assignee hereof. The disclosure of the prior Application is considered part of and is incorporated by reference in this Patent Application.

TECHNICAL FIELD

This disclosure relates to the field of wireless communication, and more particularly to link adaptation in a wireless local area network (WLAN).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP and including one or more wirelessly connected STAs associated with the AP. A station (STA) may have a wireless connection (referred to as a wireless association, or just "association") when it has authenticated and established a wireless session with the AP.

Two or more WLAN devices (such as an AP and a STA) may establish a communication link to communicate with each other via the shared wireless communication medium. Depending on the conditions on the communication link, the WLAN devices may adjust transmission parameters to optimize throughput or reliability of transmissions on the communication link. For example, the transmission parameters may be adjusted to account for radio conditions, environmental impediments, pathloss, interference due to signals of other transmitters, sensitivity of the receiver, or transmitter power, among other examples.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method performed by a first wireless local area network (WLAN) device. The method may include communicating a link adaptation test packet between the first WLAN device and a second WLAN device via a wireless channel. Communicating may include transmitting or receiving. The link adaptation test packet may include one or more test portions formatted to aid measurement of link quality metrics associated with different transmission rate options of the wireless channel. The method may include obtaining the link quality metrics associated with the different transmission rate options based on the link adaptation test packet. The method may include selecting a selected transmission rate option for transmission of a subsequent packet between the first WLAN device and the second WLAN device via the wireless channel based on the link quality metrics. The method may include communicating the subsequent packet using the selected transmission rate option.

Another innovative aspect of the subject matter described in this disclosure can be implemented as a method performed by a first station (STA) of a WLAN. The method may include receiving a link adaptation test packet from an access point (AP) of the WLAN via a wireless channel. The link adaptation test packet may include one or more test portions formatted to aid measurement of link quality metrics associated with different transmission rate options of the wireless channel. The method may include measuring the link quality metrics associated with the different transmission rate options based on the link adaptation test packet. The method may include transmitting link adaptation feedback to the AP based on the link quality metrics. The method may include receiving a subsequent packet formatted according to a transmission rate option selected by the AP based on the link adaptation feedback.

Another innovative aspect of the subject matter described in this disclosure can be implemented as an apparatus of a first WLAN device. The apparatus may include at least one modem configured to communicate a link adaptation test packet between the first WLAN device and a second WLAN device via a wireless channel. The link adaptation test packet may include one or more test portions formatted to aid measurement of link quality metrics associated with different transmission rate options of the wireless channel. The apparatus may include at least one processor communicatively coupled with the at least one modem and configured to obtain the link quality metrics associated with the different transmission rate options based on the link adaptation test packet. The at least one processor may be configured to select a selected transmission rate option for transmission of a subsequent packet between the first WLAN device and the second WLAN device via the wireless channel based on the link quality metrics. The at least one modem may be configured to communicate the subsequent packet using the selected transmission rate option.

Another innovative aspect of the subject matter described in this disclosure can be implemented as an apparatus of a second WLAN device. The apparatus may include at least one modem configured to obtain a link adaptation test packet from an access point (AP) of the WLAN via a wireless channel. The link adaptation test packet may include one or more test portions formatted to aid measurement of link quality metrics associated with different transmission rate options of the wireless channel. The apparatus may include at least one processor communicatively coupled with the at least one modem and configured to measure the link quality metrics associated with the different transmission rate options based on the link adaptation test packet. The at least one modem may be configured to output link adaptation feedback for transmission to the AP based on the link quality metrics. The at least one modem may be configured to obtain a subsequent packet from the AP via the wireless channel, the subsequent packet formatted according a transmission rate option selected by the AP based on the link adaptation feedback.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 11A depicts an example link adaptation test packet in which the link adaptation test collection is included in a padding section of a data carrying packet.

FIG. 11B depicts an example link adaptation test packet in which the link adaptation test collection is included in a link adaptation portion of a data carrying packet.

FIG. 22 shows a flowchart illustrating an example process to support link adaptation for an uplink communication.

Like reference numbers and designations in the various drawings indicate like elements.

DETAILED DESCRIPTION

Figure 1:
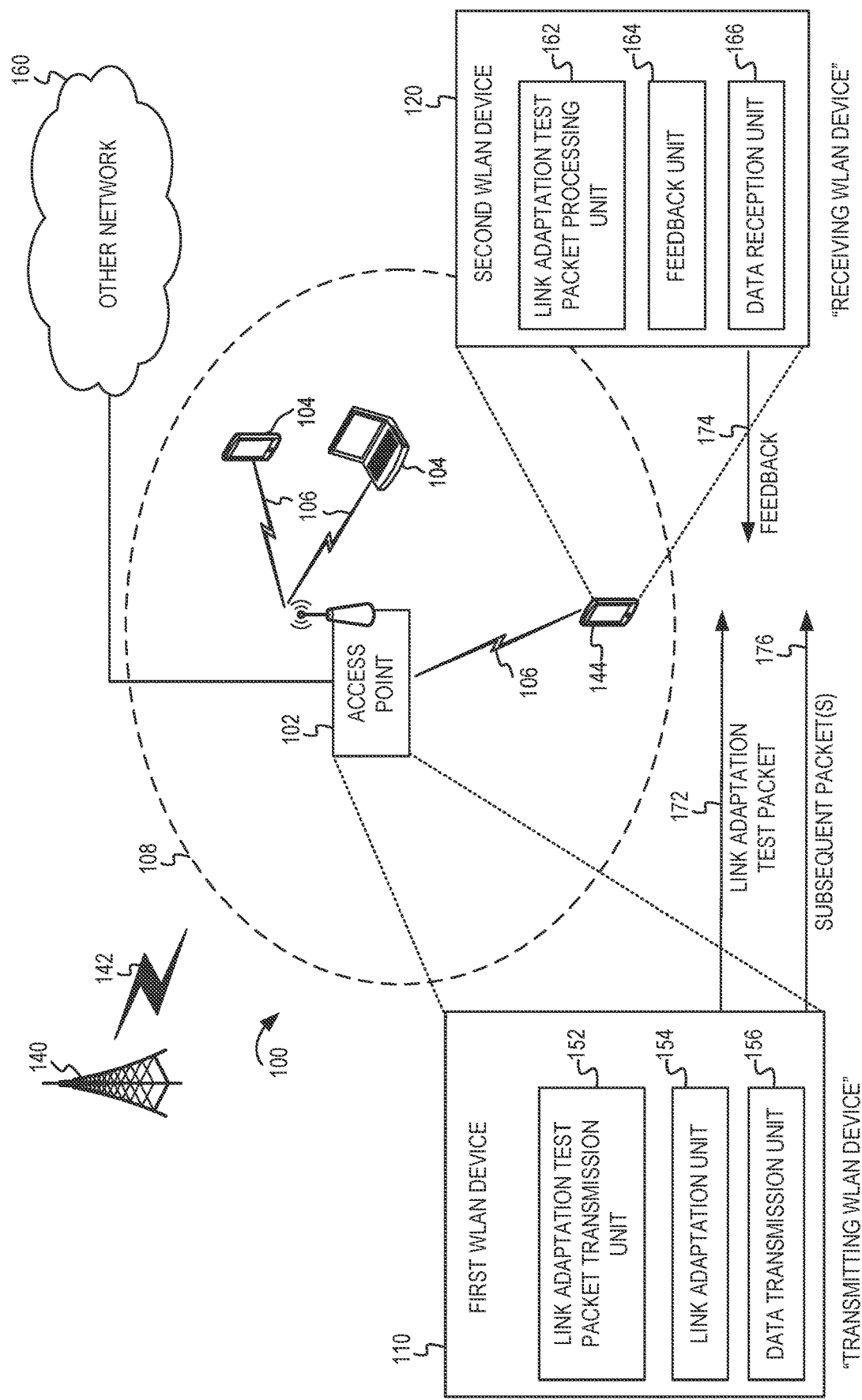
FIG. 1 shows a pictorial diagram of an example wireless communication network that supports the use of a link adaptation test packet.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an interne of things (IOT) network.

A WLAN (sometimes also referred to as a Wi-Fi™ network) in a home, apartment, business, or other area may include one or more WLAN devices. An access point (AP) is a WLAN device that includes a distribution system access function. The AP may provide distribution system access for one or more stations (STAs) that are associated with the AP. An AP may provide a wireless coverage area for devices to access the WLAN via a wireless channel. STAs can establish a wireless association (also referred to as a wireless link, wireless connection, or the like) via the channel configuration of an AP to access the WLAN. A transmitting WLAN device (which may be an AP or a STA) may establish a communication link with a receiving WLAN device over a wireless channel.

The conditions of the wireless channel may impact a transmission rate or other parameters of the communication link. Link adaptation (sometimes also referred to as rate adaptation) refers to the determination of the transmission rate (such as selecting a modulation and coding scheme (MCS)) and other parameters for a communication link based on the conditions of a wireless channel. In some implementations, link adaptation may include selecting beamforming or a spatial stream configuration for a MIMO transmission. A traditional process for link adaptation requires a series of packets and packet feedback to converge on an optimal transmission rate (such as an optimal MCS). For example, the transmitting WLAN device may use a first selected MCS when sending one or more first packets. The transmitting WLAN device may select a different MCS for later packets based on feedback (such as an acknowledgement (ACK) or negative acknowledgement (NACK)) regarding the one or more first packets or based on a packet error rate (PER) associated with the one or more first packets. Thus, the traditional process of selecting an optimal MCS for the communication link may require an inefficient and iterative process over a consecutive series of adjustments. Meanwhile, the channel conditions may change before the WLAN devices converge on the optimal transmission rate. Furthermore, different manufacturers and devices may implement different link adaptation procedures. Performance and channel efficiency may be degraded as a result of traditional ad hoc methods for link adaptation.

This disclosure provides systems, methods, and apparatus, including computer programs encoded on computer-readable media, for link adaptation in a wireless local area network. The techniques in this disclosure may be used in a link adaptation protocol for efficiently determining the transmission rate (such as an MCS) and other parameters for a communication link based on the conditions of a wireless channel. In some implementations, the link adaptation protocol may be referred to as a fast rate adaptation (FRA) protocol. Various implementations relate generally to determining a transmission rate for wireless communications from a transmitting WLAN device to a receiving WLAN device. The transmission rate may be defined by, among other parameters, an MCS selected based on channel conditions. In accordance with this disclosure, a link adaptation protocol may include one or more packets exchanged between a transmitting WLAN device and a receiving WLAN device to quickly determine an MCS or other parameter for a subsequent communication. For example, a transmitting WLAN device may communicate a first packet (which also may be referred to as a test packet, a link adaptation test packet, a fast rate adaptation test packet, or an FRA test packet) that can be used to determine one or more link quality metrics regarding the wireless channel. Communicating a test packet may refer to transmitting a test packet from the transmitting WLAN device to the receiving WLAN device or may refer to receiving a test packet from the receiving WLAN device. For brevity, some examples of this disclosure refer to communicating the test packet by transmitting the test packet to the receiving WLAN device. The receiving WLAN device can observe the test packet to determine the one or more link quality metrics. Examples of link quality metrics may include, log-likelihood ratio (LLR), signal-to-noise ratio (SNR), signal-to-interference-plus noise ratio (SINR), error vector magnitude (EVM), block error rate (BLER), bit error rate (BER), or codeword error rate (CWER), among other examples. In some implementations, link quality also may be referred to as channel quality. In some implementations, link quality also may refer to the effect of interference on one or more tones or spatial streams within a wireless channel. The test packet can be used to determine the quality of a wireless channel to support communication between the transmitting WLAN device and the receiving WLAN device. The receiving WLAN device may provide feedback information (which may be referred to as link adaptation feedback, fast rate adaptation feedback, or FRA feedback) to the transmitting WLAN device in response to the test packet. In some implementations, the transmitting WLAN device may use the feedback information to determine a transmission rate option to use for a subsequent packet to the second WLAN device. In some implementations, the receiving WLAN device may determine a selected transmission rate option based on the link quality metrics and send the selected transmission rate option in the link adaptation feedback. The transmission rate option may include an MCS option, a quantity of spatial streams, a spatial stream configuration, or any combination thereof. The techniques in this disclosure may enable selection of a transmission rate option using fewer packets than would otherwise be required to converge on the optimal transmission rate option in a traditional link adaptation process.

In some implementations, the test packet may be a new packet format defined in a standard technical specification, such as IEEE 802.11be. The test packet may be part of a link adaptation protocol specified in the standard technical specification. In some implementations, the test packet may be based on a packet format for a null data packet (NDP). For example, the test packet may be a modified NDP packet used specifically to measure the SINR on each of the OFDM subcarriers, or every N-th OFDM subcarrier. Although some of the examples in this disclosure include a test packet based on an NDP format, other alternative formats for the first packet may be possible. In some implementations, the test packet may be based on packet format for a data-carrying packet or a contention-based signaling packet (such as a request-to-send (RTS) packet). In some implementations, the test packet may be based on a traditional packet format that includes a padding section such that the padding section includes test portions corresponding to different transmission rate options. The test portions (modulated with different MCS options) may be included in a padding section at the end of a traditional packet format or in a preamble section of a traditional packet format. The test packet may be formatted to aid the determination of link quality metrics. For example, the test packet may include portions designed to test different MCS options or to determine link quality metrics that are useful for MCS selection. In some implementations, the test packet may include a testing signal (such as a predetermined testing signal) modulated using a first MCS in a first test portion and modulated using a second MCS in a second test portion. The first packet may be formatted as a MIMO transmission that includes one or more test portions for signal to interference plus noise (SINR) estimation. A receiving WLAN device can observe the various test portions of the first packet to determine one or more SINR metrics. Thus, the test packet can be used to determine the quality of a wireless channel based on the amount of interference and other noise that impact the MIMO spatial streams in the wireless channel. In some implementations, the test packet may be communicated as an initial packet of a session so that an optimal transmission rate option may be selected for use with subsequent packets of the session.

A link adaptation protocol may be defined by one or more message sequences. This disclosure includes a variety of example link adaptation message sequences which can be used depending on different types of communications. For example, a basic link adaptation message sequence may include the use of a link adaptation null data packet announcement (LA-NDPA) indicate that a test packet (which may be referred to as a link adaptation null data packet, LA-NDP) will follow the LA-NDPA. The LA- NDPA may include an indicator regarding which test signals are included in the LA-NDP and may indicate which receiving WLAN devices should observe the LA-NDP. In some implementations, the LA-NDPA may indicate a format or type of feedback expected from the receiving WLAN devices. A receiving device may send feedback information in a link adaptation feedback (LA-FB) message in response to the LA-NDP. Thereafter, the transmitting WLAN device may send a data packet using a transmission rate option that is selected based on the feedback information.

In addition to the above basic link adaptation message sequence, this disclosure includes link adaptation message sequences to address a variety of options and alternatives. For example, in some implementations, the link adaptation message sequence may include data packets that are modified to support piggybacked link adaptation test portions included with each transmission so that the transmission rate selection can be refined (if necessary) on a packet-by-packet basis. In some implementations, the link adaptation protocol may include different message sequences to support OFDMA, MU-MIMO, beamforming, and other communication types. Furthermore, this disclosure includes some link adaptation message sequences that may be used when uplink data is scheduled or triggered by an AP that receives the data.

Particular implementations of the subject matter described in this disclosure can be implemented to realize one or more of the following potential advantages. A link adaptation test packet may be used to quickly determine an optimal transmission rate option (such as an MCS option, a spatial stream configuration, or both) for subsequent transmissions without requiring a series of repetitive transmission rate adjustments to converge on the optimal transmission rate option between a transmitting WLAN device and the receiving WLAN device. Throughput and resiliency may be improved by reducing error rates in transmission that would otherwise use less optimal transmission rate settings. In addition to saving time for link adaptation between a pair of WLAN devices, the use of a single link adaptation test packet to determine an optimal transmission rate option may preserve airtime resources that could otherwise be used for other WLAN devices.

FIG. 1 shows a pictorial diagram of an example wireless communication network 100 that supports the use of a link adaptation test packet. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may provide access to another network 160. For example, the AP 102 may be connected to a gateway device (not shown) which provides connectivity to the other network 160. The WLAN 100 may include numerous wireless communication devices such as at least one access point (AP) 102 and multiple stations (STAs) 104 that may have a wireless association with the AP 102. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 111. Additionally, two STAs 104 may communicate via a direct communication link 111 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 111 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

A STA 144 is associated with the AP 102 and can receive downstream communications from, or transmit upstream communications to, the AP 102 via a communication link 106. A representative downstream communication is described in FIG. 1. To avoid ambiguity, the AP 102 may be referred to as a first WLAN device 110. Alternatively, the first WLAN device 110 may be a wireless communication device in the AP 102. Acting as the transmitting WLAN device, the first WLAN device 110 is capable of communicating the downstream data to a second WLAN device 120 (such as the STA 144). The second WLAN device 120 may be referred to as a receiving WLAN device. Thus, in FIG. 1, the first WLAN device 110 may be referred to as a transmitting WLAN device and the second WLAN device 120 may be referred to as a receiving WLAN device. However, the designations of transmitting WLAN device and receiving WLAN device may be reversed for upstream data (from the STA 144 to the AP 102). Similarly, the techniques in this disclosure may be used with peer-to-peer or mesh networks in which case one WLAN device may be considered a transmitting WLAN device and the other WLAN device may be considered a receiving WLAN device.

FIG. 1 also shows an example of potential interference 142 from an external transmitter 140 (such as a radio broadcast tower, WWAN, or another WLAN, among other examples). The interference 142 may impact channel conditions of the wireless channel used by the BSS managed by the AP 102. The interference 142 may have a greater impact on a high transmission rate (such as a first MCS) and may have a lesser impact on a low transmission rate (such as a second MCS). To provide flexibility of transmission rates, the IEEE 802.11 family of standards specify various MCS options having different modulation and coding rates. The various modulation schemes may include a binary phase shift keying (BPSK) modulation scheme, a quadrature phase shift keying (QPSK) modulation scheme, and different types of a quadrature amplitude modulation (QAM) modulation schemes, among other examples. Each MCS option may have a different data rate. A data rate may refer to how much of a data stream is actually being used to transmit usable data. A higher data rate means that the data transmission is more efficient. Meanwhile, a lower data rate may result in a more robust transmission because the transmission may include redundant data or error correction data. As described herein, a traditional technique for link adaptation may include an iterative process to sequentially adjust the MCS selection until the WLAN devices converge on an optimal transmission rate that balances data throughput with the amount of interference 142. This disclosure describes a fast link adaptation technique to determine an optimal MCS between a transmitting WLAN device (such as the first WLAN device 110) and a receiving WLAN device (such as the second WLAN device 120).

The first WLAN device 110 may include a link adaptation test packet transmission unit 152. The link adaptation test packet transmission unit 152 may be configured to transmit a first packet (which may be referred to as a link adaptation test packet 172) to the second WLAN device 120. In some implementations, the link adaptation test packet 172 may be formatted as a single user (SU) basic open loop transmission. Alternatively, the link adaptation test packet 172 may be formatted as a multi-user (MU) transmission such as an OFDMA or MU-MIMO transmission. In some implementations, the link adaptation test packet 172 may be beamformed as depicted and described in FIG. 4. Portions of the link adaptation test packet 172 may include different test signals which can be measured to determine link quality metrics. For example, the link adaptation test packet 172 may include a plurality of test portions that are modulated using a corresponding plurality of MCS options. A first portion may be modulated using a first MCS and a second portion may be modulated using a second MCS. Thus, a single link adaptation test packet 172 may support testing of a several MCS options based on current channel conditions. Alternatively, or additionally, the link adaptation test packet 172 may be formatted as a MIMO transmission and may include one or more portions for SINR estimation of the spatial streams of the MIMO transmission. Thus, a single link adaptation test packet 172 may support SINR estimation for different spatial streams based on current channel conditions. In some implementations, the link adaptation test packet 172 also may carry data other than the test portions.

The first WLAN device 110 may include a link adaptation unit 154 that is configured to determine a transmission rate or other link configuration for a subsequent packet 176 for transmission to the second WLAN device 120. For example, the link adaptation unit 154 may receive feedback information 174 from the second WLAN device 120 in response to the link adaptation test packet 172. The link adaptation unit 154 may determine a selected MCS or other transmission rate option to use for the subsequent packet 176 based on the feedback information 174. In some implementations, the feedback information 174 may include link quality metrics (such as SINR or EVM) regarding the link adaptation test packet 172. Alternatively, or additionally, the feedback information 174 may include an indicator that indicates a transmission rate option selected by the second WLAN device 120 based on the link adaptation test packet 172. After the selected transmission rate option is determined by the link adaptation unit 154, the first WLAN device 110 may transmit subsequent packets 176 using the selected MCS option. Although described in terms of an MCS option, the transmission rate option selected by the link adaptation unit 154 may be any parameter that adapts the transmission rate based on current channel conditions. A data transmission unit 156 in the first WLAN device 110 may modulate the subsequent packet 176 using the transmission rate option selected by the link adaptation unit 154 based on the feedback information 174 regarding the link adaptation test packet 172.

The second WLAN device 120 may include a link adaptation test packet processing unit 162. The link adaptation test packet processing unit 162 may receive the link adaptation test packet 172 and determine the link quality metrics regarding the link adaptation test packet 172 (or various test portions therein). For example, the link adaptation test packet processing unit 162 may process each portion separately to determine a received testing signal for each test portion. The link adaptation test packet processing unit 162 may determine the link quality metrics based on comparisons of the received testing signal with the predetermined testing signal that was used by the first WLAN device 110 for each test portion. In some implementations, the predetermined testing signal may be a known bit sequence or pattern. The link adaptation test packet processing unit 162 can compare the received testing signal with the known bit sequence or pattern to determine a BER, BLER, SNR, SINR, or EVM, among other examples.

In some implementations, the link adaptation test packet processing unit 162 may process a first portion of the link adaptation test packet 172 to determine signal strength and may process a second portion of the link adaptation test packet 172 to determine noise and interference. The link adaptation test packet processing unit 162 may determine the link quality metrics based on measurements during the first portion and the second portion of the link adaptation test packet 172. Furthermore, different link quality metrics may be determined for the different spatial streams of the link adaptation test packet 172.

The second WLAN device 120 may include a feedback unit 164 configured to prepare the feedback information 174. The feedback unit 164 may select an MCS option based on the link quality metrics determined by the link adaptation test packet processing unit 162. Alternatively, the feedback unit 164 may prepare a feedback message that includes the link quality metrics. A data reception unit 166 in the second WLAN device 120 may receive and process the subsequent packet 176 based on a selected transmission rate option (such as a selected MCS option).

Figure 2:
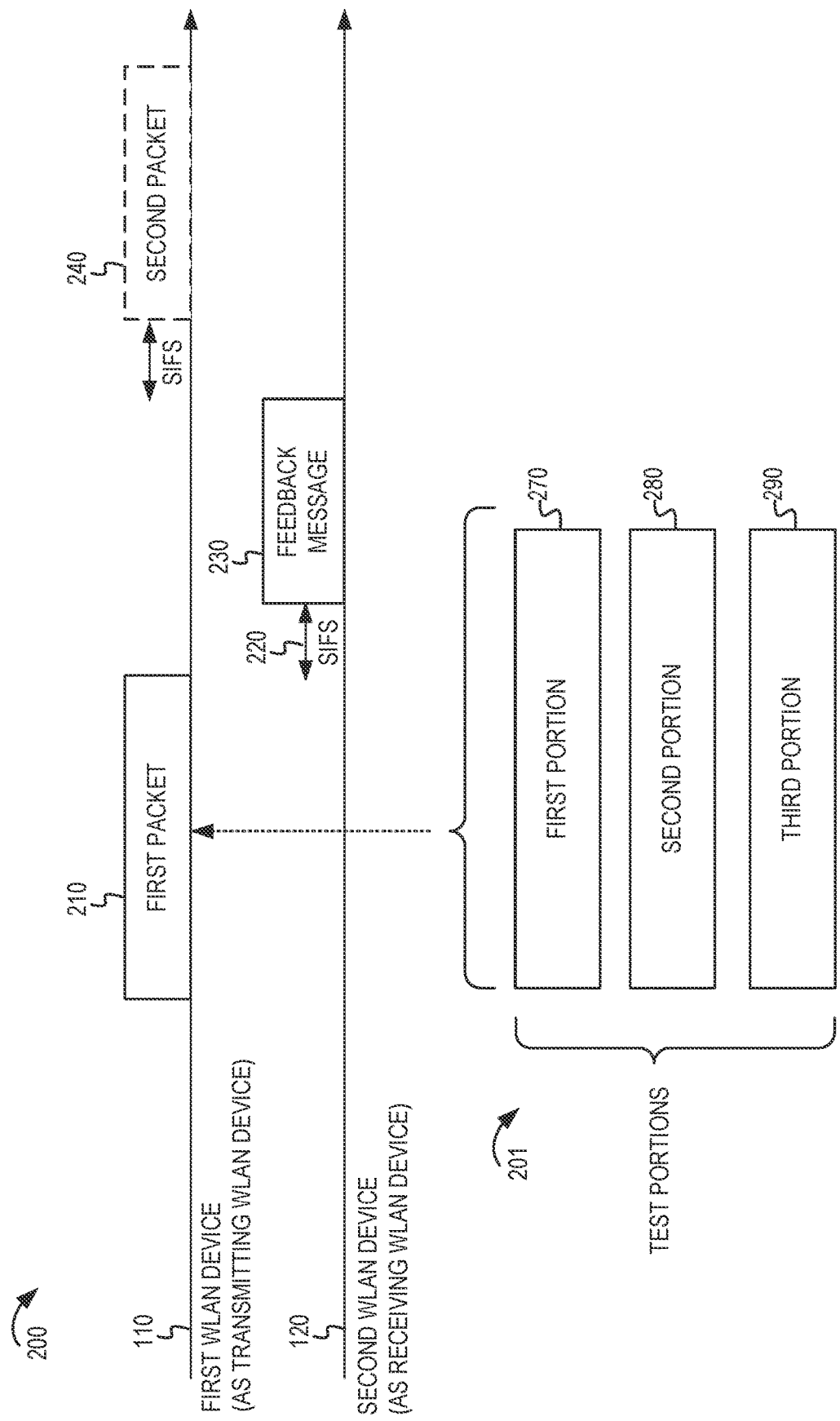
FIG. 2 shows an example link adaptation protocol that uses a link adaptation test packet.

FIG. 2 depicts an example link adaptation protocol that uses a link adaptation test packet. The example link adaptation protocol 200 may begin with a first packet 210 from the first WLAN device 110 to the second WLAN device 120. The first packet 210 may be a link adaptation test packet and may include an indicator to indicate that the first packet includes multiple test portions 201. For example, in some implementations, the first packet 210 may include a link adaptation testing capability or enablement indicator to indicate that the first packet 210 is formatted for use in the link adaptation protocol 200. In some implementations, a testing header in the first packet 210 may indicate which transmission rate options are used for the test portions 201. The transmission rate options may be various MCS options. In some implementations, the testing header in the first packet 210 may indicate a configuration of the one or more portions for SINR estimation. For example, the testing header may indicate a predetermined bit sequence, null pattern, or quantity of OFDM symbols, among other examples. In one example of FIG. 2, the first packet 210 may include a first portion 270 modulated using a first MCS option, a second portion 280 modulated using a second MCS option, and a third portion 290 modulated using a third MCS option.

Upon receiving the first packet 210, the second WLAN device 120 may determine a success or error rate for each of the test portions 201 to determine which MCS option had a highest throughput and quality above a threshold value. For example, if the first portion 270 and the second portion 280 were both received with a quality above the threshold value, the second WLAN device 120 may determine which MCS option (for the first portion 270 and the 280) would result in a highest data throughput. Meanwhile, if the third portion 290 was received with a quality below the threshold value (such as a high bit error rate indicating lower quality), the second WLAN device 120 may determine that the third MCS option should not be used for a subsequent packet. A low quality MCS may result in retransmissions which consume airtime and result in additional processing overhead. Meanwhile, if multiple MCS options result in a quality metric above the quality threshold, the optimal MCS option is the one that would result in the highest throughput while having acceptable quality above the threshold value.

In another example of FIG. 2, the first packet 210 may include portions to enable SINR measurements. Some traditional techniques for selecting an MCS may utilize a signal-to-noise ratio (SNR) as a metric for determining link quality. SNR may represent a rough estimate of signal strength compared to noise which can be measured during a transmission. For example, a transmitting WLAN device may send a first packet which can be used by the receiving WLAN device to determine a signal (S) strength and a coarse noise (N) estimate. The receiving WLAN device (or the transmitting WLAN device) may select an MCS based on the S and N estimates. The traditional techniques for determining SNR may not account for the impact of interference (I). Interference is traditionally measured during an idle measurement period of the channel, during which time the transmitting WLAN device and the receiving WLAN device can measure interference caused by other transmitters (such as those which are not part of the WLAN). The idle measurement period may be predetermined based in synchronized idle periods or may be triggered by one of the WLAN devices. Because traditional techniques for interference measurement rely on idle measurement periods, the traditional techniques may cause delays and may not be adequate for fast link adaptation.

In some implementations, the first packet may include a first portion for estimating signal and noise and may include a second portion for interference estimation. For example, the second portion of the packet may include one or more orthogonal frequency division multiplexed (OFDM) symbols for interference estimation. The one or more OFDM symbols of the second portion may include null values on some or all subcarriers (also referred to as tones) of the OFDM symbols. The null values may provide an idle measurement period during the first packet. Alternatively, or additionally, the one or more symbols may be populated with a predetermined bit sequence (such as a repetition of a long training field (LTF)). In some implementations, the bit sequence may be modified to null particular subcarriers. In some implementations, the one or more OFDM symbols may be populated with at least part of a same bit sequence (such as an LTF sequence or other predetermined bit sequence) which can be interpreted by the receiving WLAN device. Alternatively, or additionally, an SINR estimation sequence (such as the LTF sequence) may be repeated over two or more OFDM symbols in the first packet.

Upon receiving the first packet 210, the second WLAN device 120 may determine one or more SINR metrics based on the first packet 210. For example, the SINR metrics may be include a different SINR metric for each subcarrier or for different groups of subcarriers in the OFDM transmission. The second WLAN device 120 may select an MCS option for a subsequent MIMO transmission based on the SINR metrics. For example, if the average SINR for the wireless channel is above a threshold value, the second WLAN device 120 may select a first MCS option with a high data throughput. Meanwhile, if the average SINR for the wireless channel is below the threshold value, the second WLAN device 120 may select a second MCS option for the subsequent packet.

In response to the first packet 210, the second WLAN device 120 may send a feedback message 230 back to the first WLAN device 110. The feedback message 230 may begin after a short interframe space (SIFS) 220, which represents a determinable time period to maintain synchronization in the WLAN. The feedback message 230 may indicate the link quality metrics regarding the test portions 201 or may indicate the optimal transmission rate option selected by the second WLAN device 120 based on the quality and throughput. Based on the feedback information in the feedback message 230, the first WLAN device 110 may determine a selected transmission rate option to use for all or part of a second packet 240 transmitted from the first WLAN device 110 to the second WLAN device 120.

In some implementations, the first packet may include the testing signal in a single orthogonal frequency division multiplexed (OFDM) symbol (or a single resource unit of an orthogonal frequency division multiple access (OFDMA) symbol). For example, the single OFDM symbol may include a first tone (or a first set of tones) that have the testing signal modulated using the first MCS and a second tone (or second set of tones) that have the testing signal modulated using the second MCS. In some implementations, each tone in the OFDM symbol may be modulated using a different MCS. Alternatively, or additionally, the predetermined testing signal may be modulated using a first MCS for a first OFDM symbol of the first packet and modulated using a second MCS for a second OFDM symbol of the first packet. A receiving WLAN device can observe the various portions of the first packet for the predetermined testing signal using the different MCS.

In some implementations, the first packet may be useful in estimating link quality metrics for various spatial streams of a MIMO transmission from the transmitting WLAN device to the receiving WLAN device. For example, the link quality metrics may indicate the impact of interference for particular spatial streams in a MIMO transmission. In some implementations of this disclosure, a first packet may include portions for estimating link quality metrics of multiple spatial streams that will be used in a subsequent MIMO transmission. Thus, in some implementations, a single test packet may be used to determine link quality metrics based on MIMO spatial streams so that an optimal MCS may be selected for the subsequent MIMO transmission. In some implementations, the first packet may include a series of OFDM symbols with link adaptation estimation bit sequences.

Figure 3:
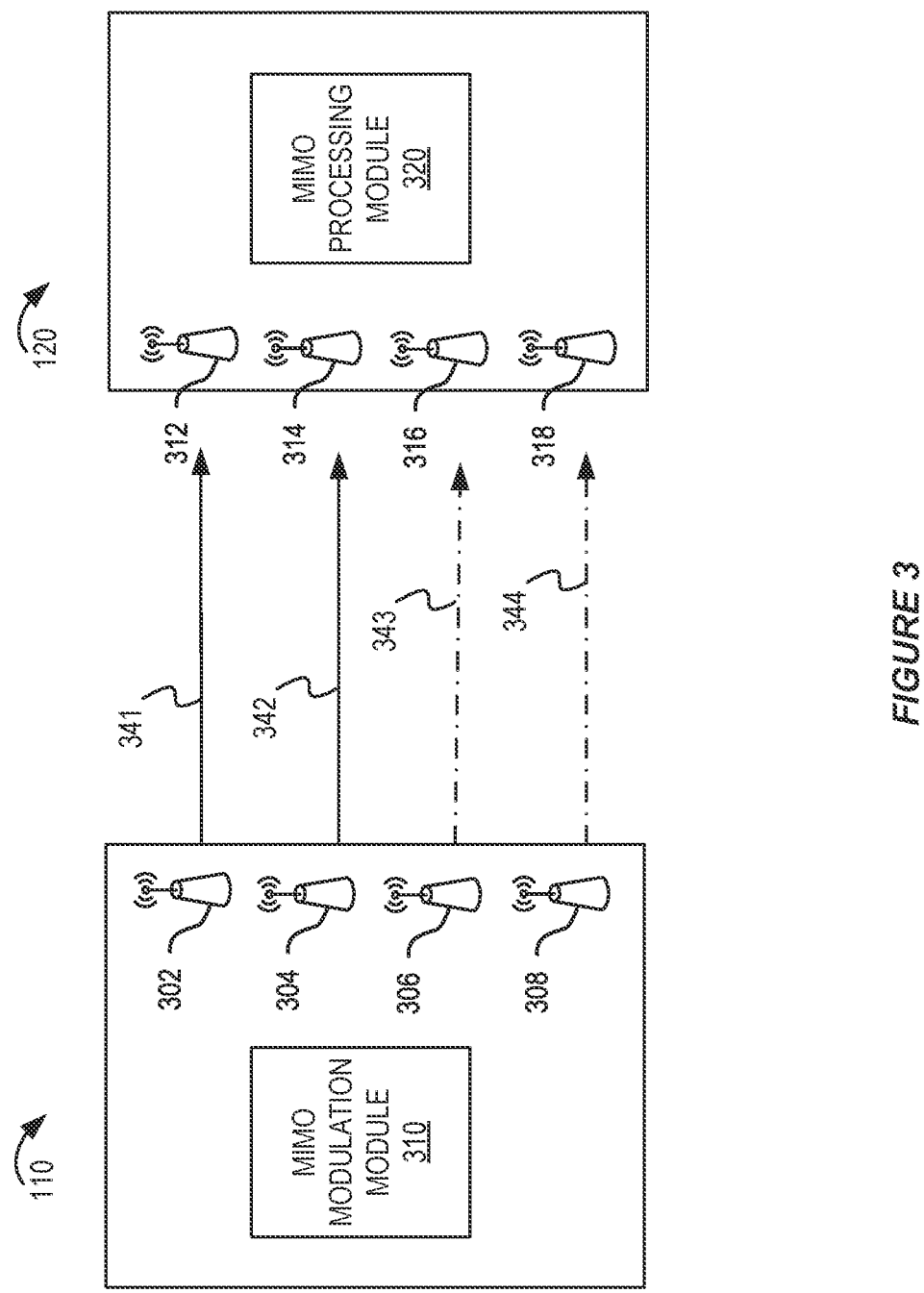
FIG. 3 shows a pictorial diagram of multiple-input-multiple output (MIMO) communications.

FIG. 3 shows a pictorial diagram of MIMO communications. In FIG. 3, a first WLAN device 110 may include four antennas 302, 304, 306, and 308. A second WLAN device 120 may include antennas 312, 314, 316, and 318. The quantities of antennas in each of the first WLAN device 110 and the second WLAN device 120 are provided only as examples, and other quantities of antennas may be used. In some implementations, the quantity of antennas in the second WLAN device 120 may be different from the quantity of antennas in the first WLAN device 110. Spatial diversity may be used by one or both of a transmitting device or a receiving device to increase the robustness of a transmission. For example, to implement a transmit diversity scheme, the first WLAN device 110 may transmit the same data redundantly over two or more antennas. WLAN devices that include multiple antennas also may support space-time block coding (STBC). With STBC, a transmitting device also transmits multiple copies of a data stream across a number of antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams (described below). The $N_{SS}$ spatial streams may be mapped to a number $N_{STS}$ of space-time streams, which are then mapped to $N_{Tx}$ transmit chains.

WLAN devices that include multiple antennas also may support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are then separately encoded and transmitted in parallel via the multiple $N_{Tx}$ transmit antennas. If the first WLAN device 110 includes $N_{Tx}$ transmit antennas and the second WLAN device 120 includes $N_{Rx}$ receive antennas, then the maximum number $N_{SS}$ of spatial streams that the first WLAN device 110 can simultaneously transmit to the second WLAN device 120 is limited by the lesser of $N_{Tx}$ and $N_{Rx}$.

In some implementations, the first WLAN device 110 and the second WLAN device 120 may be able to implement both transmit diversity as well as spatial multiplexing as shown in FIG. 3. For example, in instances in which the number $N_{SS}$ of spatial streams is less than the number $N_{Tx}$ of transmit antennas, the spatial streams may be multiplied by a spatial expansion matrix to achieve transmit diversity. In FIG. 3, the first WLAN device 110 is transmitting a first spatial stream using transmit diversity as a first signal 341 from antenna 302 of the first WLAN device 110 to antenna 312 of the second WLAN device 120 and a second signal 342 from antenna 304 of the first WLAN device 110 to antenna 314 of the second WLAN device 120. The first signal 341 and the second signal 342 may be redundant copies of the same data. The first WLAN device 110 is transmitting a second spatial stream using transmit diversity as a third signal 343 from antenna 306 of the first WLAN device 110 to antenna 316 of the second WLAN device 120 and a fourth signal 344 from antenna 308 of the first WLAN device 110 to antenna 318 of the second WLAN device 120. The third signal 343 and the fourth signal 344 may be redundant copies of the same data. However, the data for the first spatial stream (in signals 341 and 342) may be different from the data for the second spatial stream (in signals 343 and 344). A MIMO modulation module 310 in the first WLAN device 110 may determine the spatial streams and modulate the data for each spatial stream for transmission by the antennas 302, 304, 306, and 308. A MIMO processing module 320 of the second WLAN device 120 may process the received signals 341, 342, 343, and 344 to recover the spatial streams.

In some implementations, a test packet may be communicated as a MIMO transmission using the signals 341, 342, 343, and 344. The test packet may include a link quality estimation portion that occupies one or more OFDM symbols encoded according to the MIMO spatial streams supported between the first WLAN device 110 and the second WLAN device 120. Therefore, the test packet may enable the second WLAN device 120 to accurately determine link quality metrics for the MIMO spatial streams. The link quality metrics can be used by either the second WLAN device 120 or the first WLAN device 110 to determine an optimal transmission rate for a subsequent MIMO transmission that uses the same spatial stream configuration as the first packet.

Figure 4:
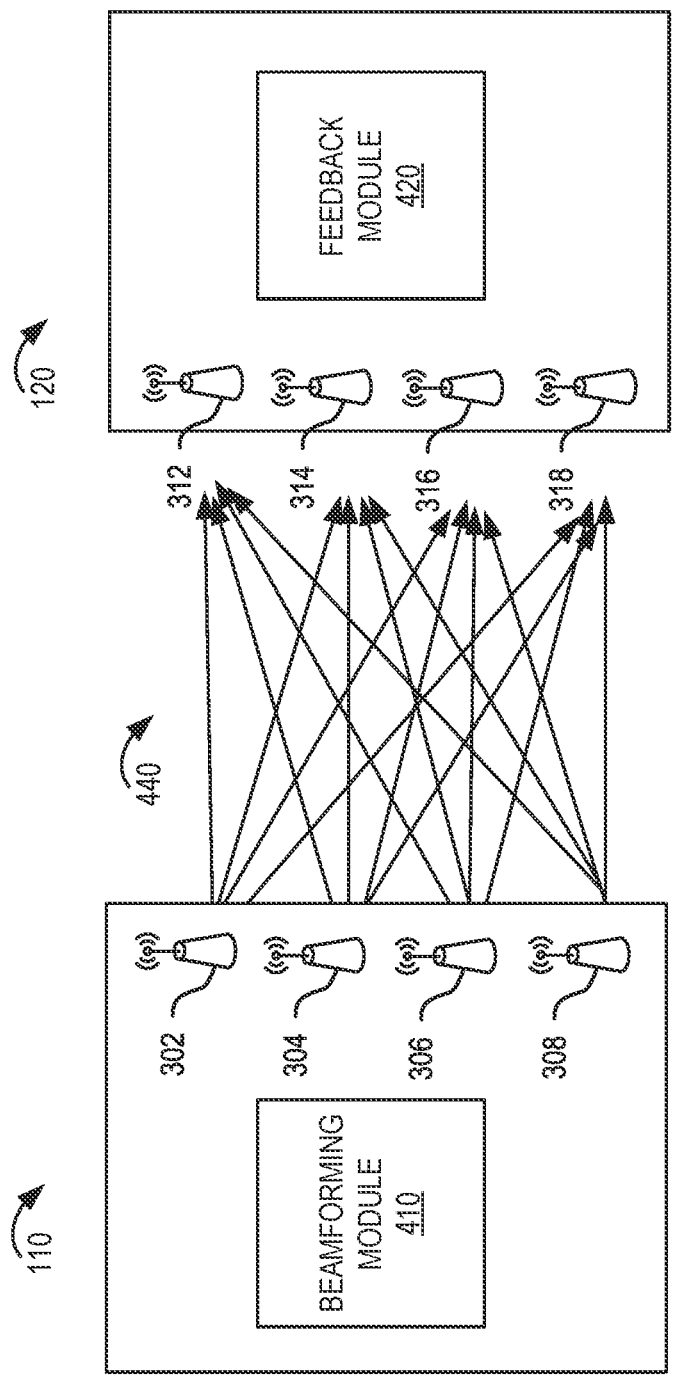
FIG. 4 shows a pictorial diagram of beamforming MIMO communications.

FIG. 4 shows a pictorial diagram of beamforming MIMO communications. The techniques in this disclosure may be used with beamformed MIMO communications. As described in FIG. 3, the first WLAN device 110 in FIG. 4 includes four antennas 302, 304, 306, and 308. The second WLAN device 120 includes antennas 312, 314, 316, and 318. APs and STAs that include multiple antennas also may support beamforming. Beamforming refers to the focusing of the energy of a transmission in the direction of a target receiver. Beamforming may be used both in a single-user context, for example, to improve SNR or SINR, as well as in a multi-user (MU) context, for example, to enable MU multiple-input multiple-output (MIMO) (MU-MIMO) transmissions (also referred to as spatial division multiple access (SDMA)). To perform beamforming, a transmitting device (such as first WLAN device 110), referred to as the beamformer, transmits signal 440 from each of multiple antennas 302, 304, 306, and 308. The beamformer configures the amplitudes and phase shifts between the signals 440 transmitted from the different antennas such that the signals add constructively along particular directions towards the intended receiver (such as the second WLAN device 120), which is referred to as a beamformee. A beamforming module 410 in the first WLAN device 110 may determine the amplitudes and phase shifts for the various signals 440. The manner in which the beamformer configures the amplitudes and phase shifts depends on channel state information (CSI) associated with the wireless channels over which the beamformer intends to communicate with the beamformee.

To obtain the CSI for beamforming, the beamformer may perform a channel sounding procedure with the beamformee. For example, the beamformer may transmit one or more sounding signals (for example, in the form of a null data packet (NDP)) to the beamformee. The beamformee may then perform measurements for each of the $N_{Tx} \times N_{Rx}$ sub-channels corresponding to all of the transmit antenna and receive antenna pairs based on the sounding signal. For example, a feedback module 420 of the beamformee may generate a feedback matrix based on the channel measurements and, typically, compresses the feedback matrix before transmitting the feedback to the beamformer. The beamformer may then generate a precoding (or "steering") matrix for the beamformee based on the feedback and use the steering matrix to precode the data streams to configure the amplitudes and phase shifts for subsequent transmissions to the beamformee.

In some implementations, the channel sounding procedure for beamforming may be extended or modified to support link adaptation. For example, the sounding signals (such as the NDP) may be modified to include or add a link adaptation testing signals, such that one or more OFDM symbols are added to the NDP for SINR estimation. In some implementations, the channel sounding procedure and CSI feedback may be performed first to determine beamforming coefficients before transmitting a link adaptation test packet. The link adaptation test packet may be beamformed based on the channel sounding procedure and CSI feedback so that the link quality metrics accurately reflect the link quality for each beamformed spatial stream between the first WLAN device 110 and the second WLAN device 120 that will be used for a subsequent beamformed MIMO packet.

Figure 5A:
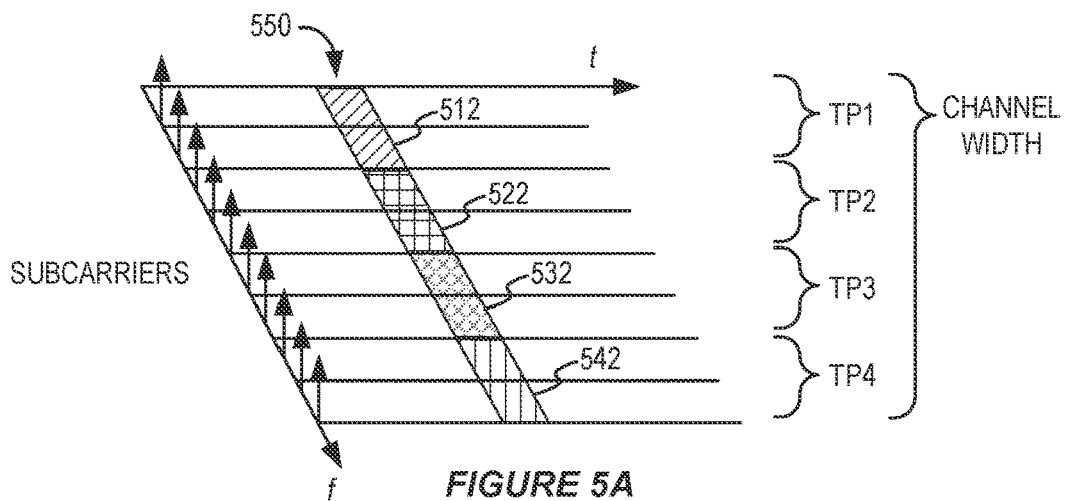
FIG. 5A shows an example conceptual diagram in which an orthogonal frequency division multiplexing (OFDM) symbol includes multiple link adaptation test portions.

FIG. 5A shows an example conceptual diagram in which an OFDM symbol includes multiple link adaptation test portions. The OFDM channel width may include multiple subcarriers. The subcarriers also may be referred to as tones. A WLAN packet (also referred to as a PPDU) includes data that is encoded using the subcarriers of the channel width. A PPDU may be different lengths of time and include multiple OFDM symbols. In some implementations, a transmitting WLAN device may include one OFDM symbol (such as OFDM symbol 550) that has different test portions modulated using a testing signal or different MCS. For example, the OFDM symbol 550 in FIG. 5A includes four test portions 512, 522, 532, and 542 which may be referred to as test portion 1 (TP1), TP2, TP3, and TP4, respectively. In some implementations, each test portion may be modulated using a different MCS so that a variety of MCS options can be included in the OFDM symbol 550. Each test portions may be a set of contiguous subcarriers (as shown in FIG. 5A) or may be a set of non-contiguous subcarriers (so that the full channel width may have different subcarriers modulated with the MCS option for each test portion). In some implementations, the test portions may be made up of only one subcarrier each. For example, the test portions TP1, TP2, TP3, and TP4 may be one subcarrier each. The remaining subcarriers may be used for data or other signaling.

Figure 5B:
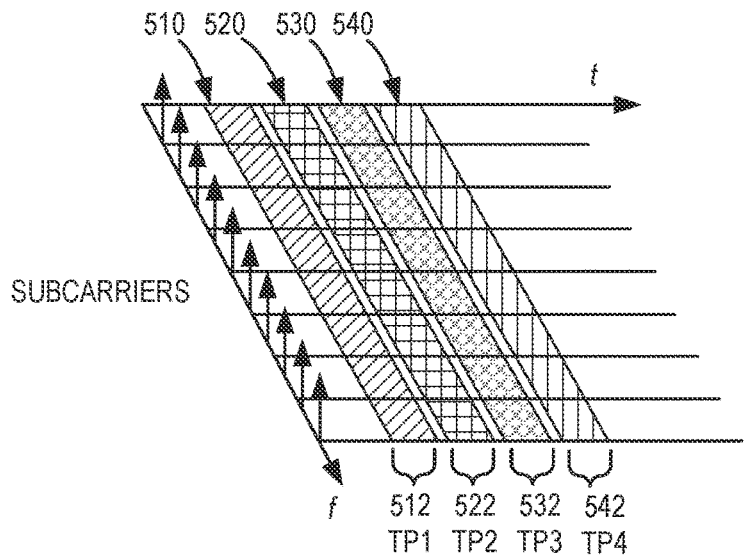
FIG. 5B shows an example conceptual diagram in which multiple OFDM symbols may be used for a link adaptation test packet.

FIG. 5B shows an example conceptual diagram in which multiple OFDM symbols may be used for a link adaptation test packet. For example, a first OFDM symbol 510 may include a first test portion (TP1) 512. A second OFDM symbol 520 may include a second test portion (TP2) 522. A third OFDM symbol 530 may include a third test portion (TP3) 532. And a fourth OFDM symbol 540 may include a fourth test portion (TP4) 542. Each of the test portions 512, 522, 532, and 542 may be modulated with a different MCS.

Figure 5C:
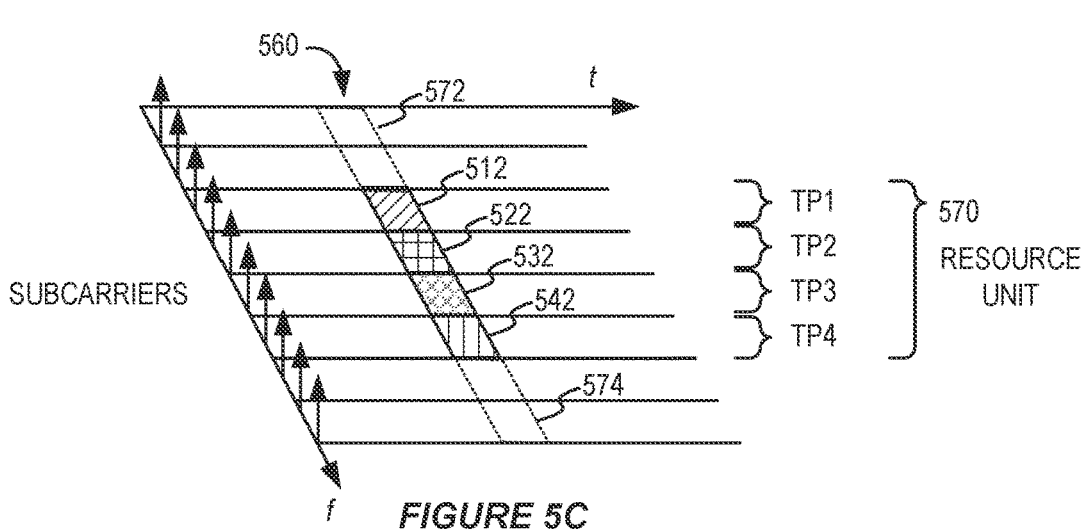
FIG. 5C shows an example conceptual diagram in which the link adaptation test portions are included in a resource unit of an orthogonal frequency division multiple access (OFDMA) transmission.

FIG. 5C shows an example conceptual diagram in which the link adaptation test portions are included in a resource unit of an OFDMA transmission. IEEE 802.11ax introduced the use of OFDMA in a WLAN. OFDMA breaks down the channel width into a plurality of resource units (RUs). Each RU may include a different quantity of subcarriers. Using OFDMA, an AP may allocate different RUs for different WLAN devices. For example, a PPDU 560 may include different RUs allocated for a first WLAN device, a second WLAN device, a third WLAN device, and a fourth WLAN device. One RU 570 may be allocated for a first WLAN device in the PPDU 560, while other RUs 572 and 574 are allocated for different WLAN devices. The allocation of RUs also may be used to schedule channel access. For example, a trigger message from an AP may indicate which RUs are allocated to particular STAs to use for uplink traffic in the PPDU that follows the trigger message.

In the example shown in FIG. 5C, a first RU 570 may include link adaptation test portions from a first WLAN device (such as an AP) to a second WLAN device (such as a STA). Thus, the RU 570 may be divided by frequency division to support different test portions 512, 522, 532, and 542. The test portions 512, 522, 532, and 543 may occupy different tones (or sets of tones) within the RU 570. Each test portion may be modulated using a different MCS option.

The concepts described in FIGS. 5A, 5B, and 5C are illustrative examples and are not mutually exclusive. For example, when a PPDU includes multiple OFDM symbols, each OFDM symbol may carry user data or other signaling in some subcarriers and a test portion in other subcarriers. Furthermore, a series of OFDM symbols may be used to communicate test portions which occupy subsets of the subcarriers in each OFDM symbol. The quantity and size of the test portions in FIGS. 5A-5C may vary and may depend on the quantity of MCS options being tested in the link adaptation test packet.

Figure 6:
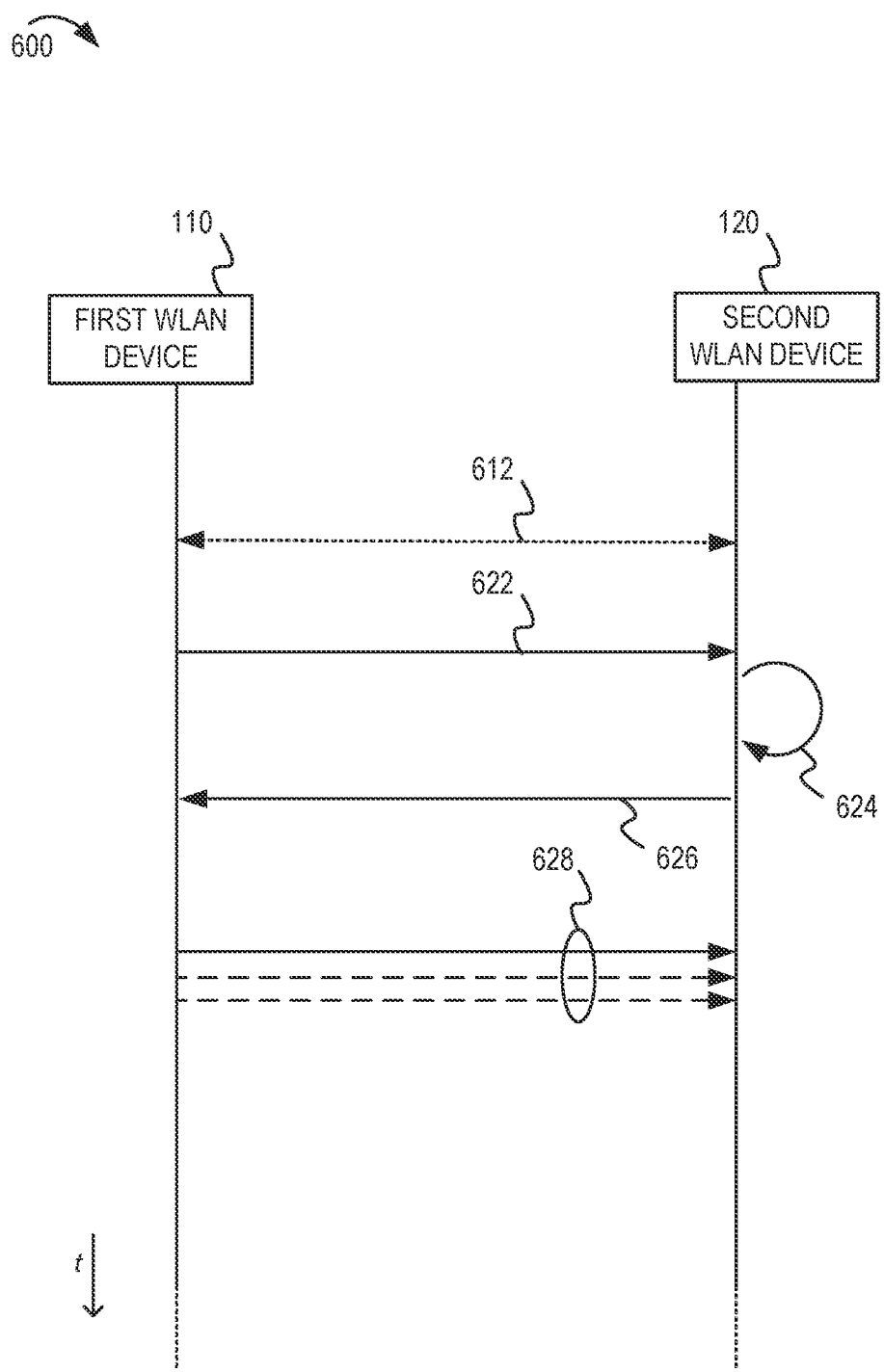
FIG. 6 shows an example message flow diagram of a link adaptation protocol using a link adaptation test packet.

FIG. 6 depicts an example message flow diagram of a link adaptation protocol using a link adaptation test packet. The example message flow 600 shows the first WLAN device 110 (as the transmitting WLAN device) and the second WLAN device 120 (as the receiving WLAN device). The first WLAN device 110 and the second WLAN device 120 may exchange configuration messages 612 to establish a wireless association over a wireless communication medium.

The first WLAN device 110 may transmit a first packet 622 to the second WLAN device 120. The first packet 622 may include link adaptation test portions. The second WLAN device 120 may process (shown at block 624) the first packet 622 to determine link quality metrics regarding the first packet 622 as described above. The second WLAN device 120 may transmit feedback information 626 to the first WLAN device 110 based on the first packet 622. Based on the feedback information 626, the first WLAN device 110 may determine a selected transmission rate option (such as an MCS) to use for transmission of subsequent packets 628 to the second WLAN device 120.

Figure 7:
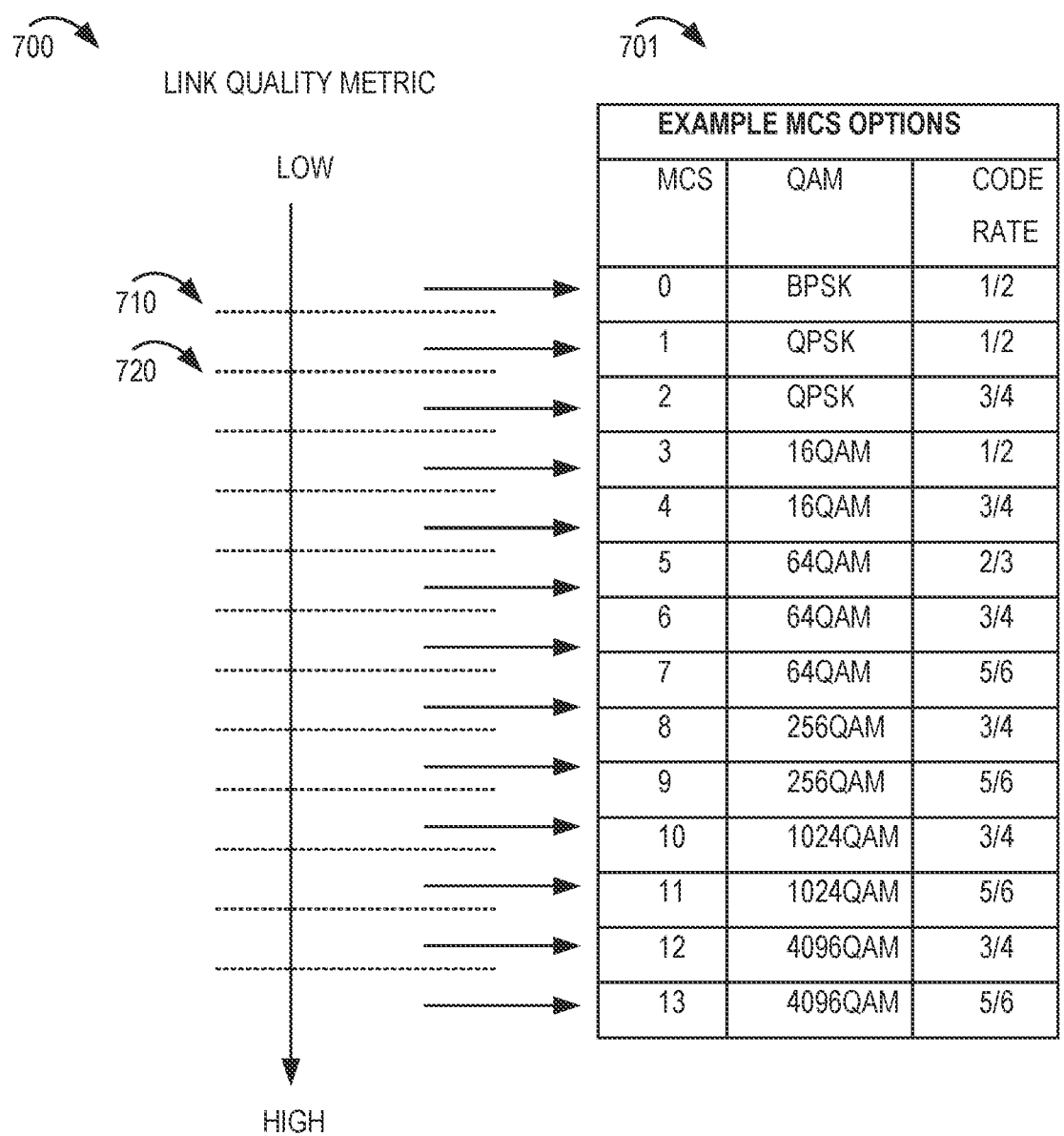
FIG. 7 shows an example mapping between link adaptation characteristics and example corresponding modulation and coding scheme (MCS) options.

FIG. 7 shows an example mapping between link quality metrics 700 and example corresponding MCS options. In some implementations, each link quality metric may be used to determine an MCS option for particular spatial stream or portion of a MIMO transmission. In some other implementations, the link quality metrics for the first packet may be averaged to determine an average link quality metric 700 for communications from a first WLAN device to a second WLAN device via a wireless channel. For example, the average link quality metric 700 may represent the overall quality of the communication path between the first WLAN device and the second WLAN device. An average link quality metric 700 may range from low to high. When the link quality metric is based on SINR or EVM, a lower average value indicates a poor link quality, and a higher average value indicates a better link quality. For example, a lower average SINR metric may indicate a poor link quality that would benefit from using a more robust MCS option. A higher average SINR metric may indicate a high link quality that supports a higher data transfer rate using higher order MCS. When the link quality metric is based on another measurement, there may be an inverse mapping such that the relationship from low to high may be reversed. For example, a low BER (or BLER) may indicate a high link quality (and may be mapped to a higher order MCS), while a high BER (or BLER) may indicate a low link quality (and may be mapped to a lower order MCS).

The chart 701 in FIG. 7 shows example MCS options. The chart 701 shows fourteen MCS options (numbered MCS 0 to MCS 13), each having a different combination of modulation scheme and forward error correction (FEC) code rate (sometimes referred to as code rate). The various modulation schemes may include a binary phase shift keying (BPSK) modulation scheme, a quadrature phase shift keying (QPSK) modulation scheme, and different types of a quadrature amplitude modulation (QAM) modulation schemes, among other examples. The forward error correction code rate may impact how much of a data stream is actually being used to transmit usable data. For example, a code rate of ⅚ means that 83.3% of a transmitted data stream includes actual data (or every five out of six bits are information bits with the remaining bits are parity bits). A higher code rate means that the data transmission is more efficient. Meanwhile, a lower code rate may result in a more robust transmission because the transmission may include redundant data or error correction data, among other examples. Based on the chart 701, the data throughput may increase as a number for the MCS option increases. For example, MCS 13 has a higher data throughput than MCS 0. However, the higher numbered MCS options are more susceptible to errors caused by interference or poor radio conditions. Thus, the higher numbered MCS options are more appropriate for use in a communication channel having with a higher SINR. Thus, the SINR metric may be used to determine which MCS option results in an optimal data throughput based on current radio conditions.

In some implementations, one or more thresholds may be used with the link quality metric to determine which MCS option to select. For illustrative purposes, the link quality metric may be based on average SINR. When the average SINR metric is below a first threshold 710, then MCS 0 may be selected. When the average SINR metric is above the first threshold 710 and below a second threshold 720, then MCS 1 may be selected. As an illustrative example, consider a communications link which uses a 2×2 MIMO transmission configuration with 2 streams and IEEE channel model D with non-line-of-sight (NLOS). For such a communication link, an MCS 0 may be selected if the SINR metric is below 9.5 dB. An MCS 1 may be selected if the SINR metric is in a range from 9.5 dB to 12 dB. An MCS 2 may be selected if the SINR metric is in a range from 12 dB to 14 dB. An MCS 3 may be selected if the SINR metric is in a range from 14 dB to 17.5 dB, and so on. The described thresholds and MCS options shown in FIG. 7 are provided for illustrative purposes. If the SINR varies from one OFDM subcarrier to the next, the optimum MCS may depend on more than the average SINR but also the variation in the SINR. The quantity of thresholds and the threshold values may depend on transmitter or receiver capabilities. Alternatively, or additionally, the quantity of thresholds and the threshold values may be based on system or device configuration.

Figure 8A:
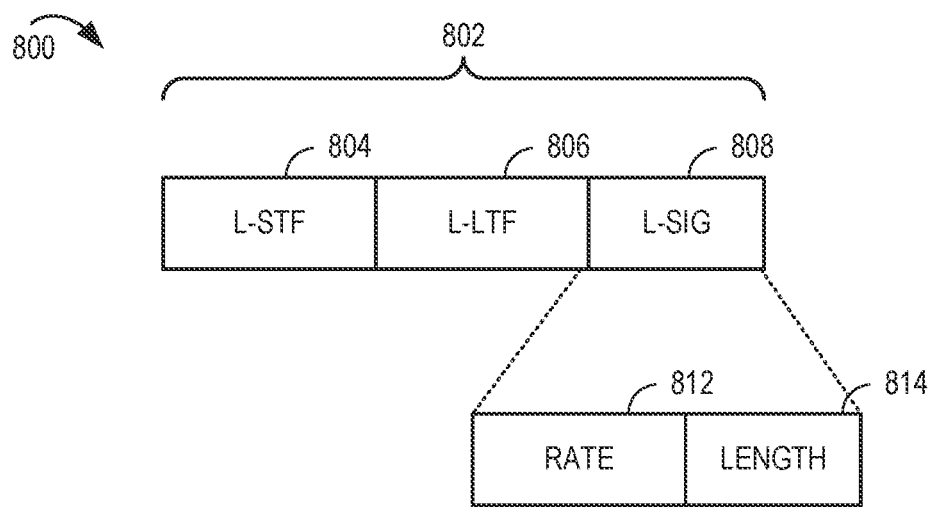
FIG. 8A depicts a first example feedback message format.

FIG. 8A depicts a first example feedback message format. The first example feedback message format 800 may be based on a legacy preamble associated with legacy WLAN frame format 802. The feedback message format 800 may include a legacy short training field 804 (L-STF), a legacy long training field 806 (L-LTF), and a legacy signal field 808 (L-SIG). The L-STF and the L-LTF are used for detection and synchronization using predetermined training signals. Thus, the L-SIG field is the only portion of the legacy preamble which carries data. The L-SIG field includes a set of bits for indicating a rate setting 812 and a set of bits for indicating a length 814 of the legacy WLAN packet that would normally follow the legacy preamble. In the example, of FIG. 8A, the feedback message may end with the L-SIG. Therefore, the length 814 may indicate a value of "0." The rate setting 812 may indicate a selected MCS option determined by the receiving WLAN device based on link quality metric measured for a link adaptation testing portion of a link adaptation test packet.

Figure 8B:
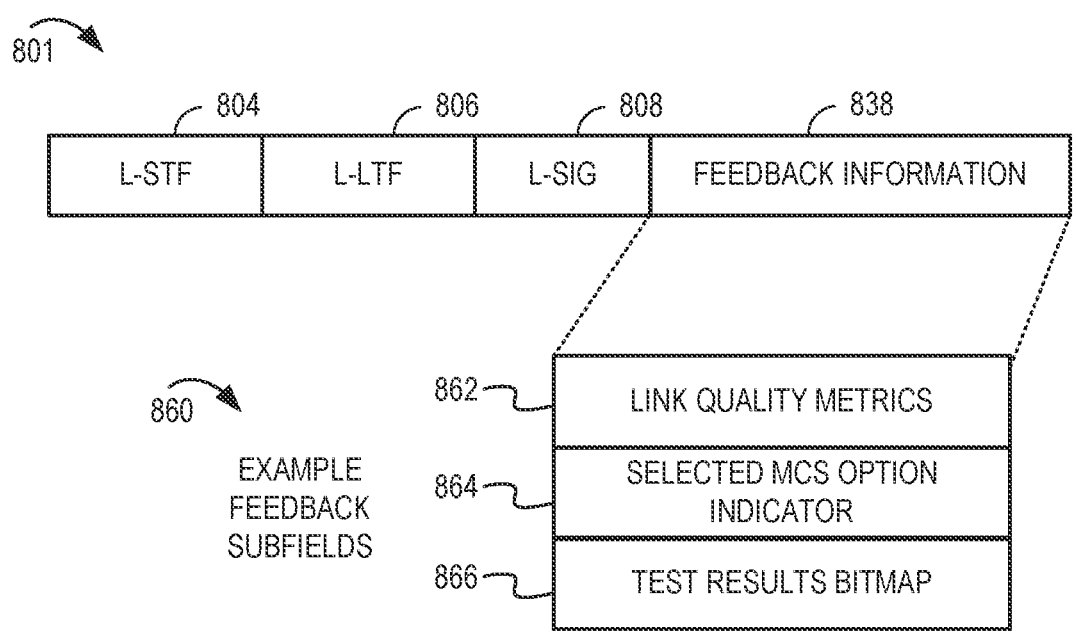
FIG. 8B depicts a second example feedback message format.

FIG. 8B depicts a second example feedback message format. The second example feedback message format 801 may be based on a legacy preamble (L-STF 804, L-LTF 806, and L-SIG 808) followed by feedback information 838. FIG. 8B shows several example feedback subfields 860 contained in the feedback information 838. The example feedback subfields 860 include one or more link quality metrics 862, a selected MCS option indicator 864, and test results bitmap 866. For example, the link quality metrics 862 may indicate the BER, EVM, BLER, SINR, or other metrics for each spatial stream, for each subcarrier, for each group of subcarriers, or for portions of the link adaptation test packet, among other examples. The selected MCS option indicator 864 may indicate a selected MCS chosen by the receiving WLAN device. The test results bitmap 866 may indicate which MCS options are recommended or which portions of the link adaptation test packet had link quality metrics above a threshold value. The examples in FIGS. 8A and 8B are intended as illustrative examples, and other variations may be possible. For example, in some implementations there may be fewer, more, or different subfields in the feedback information 838.

Figure 9A:
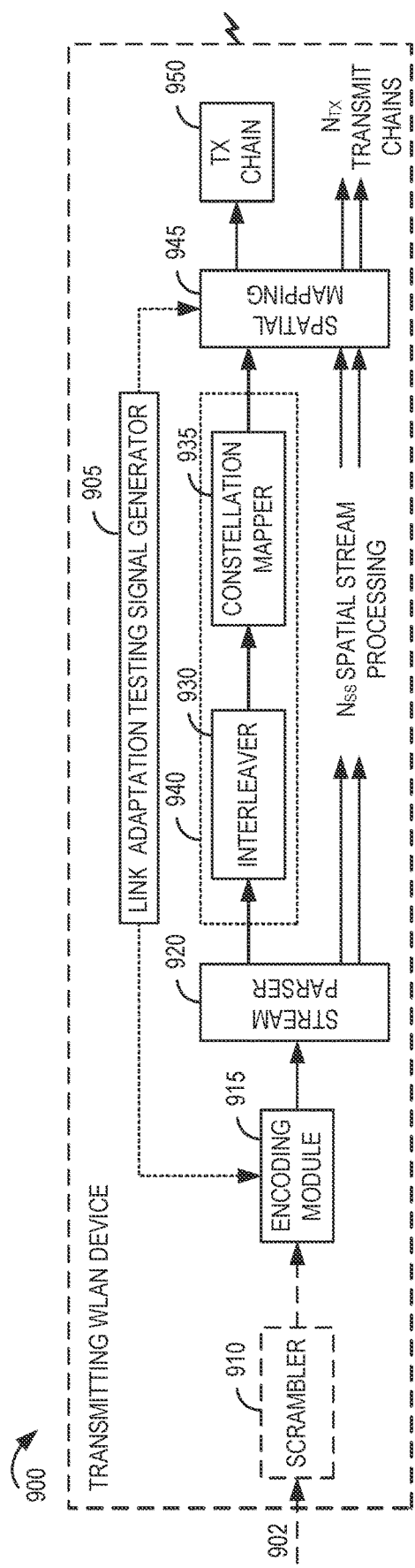
FIG. 9A depicts a block diagram of an example transmitting WLAN device that supports link adaptation.

FIG. 9A depicts a block diagram of an example transmitting WLAN device that supports link adaptation. The example transmitting WLAN device 900 is one of many designs for a first WLAN device. The example transmitting WLAN device 900 is based on a transmitter that supports transmission of user data as well as a link adaptation testing signal. The example transmitting WLAN device 900 is designed for binary convolutional coding (BCC) encoding. Another design (not shown) may support low data parity check (LDPC) encoding. The transmitting WLAN device 900 in FIG. 9A supports the transmission of data 902. The data 902 may be processed by a scrambler 910 and an encoding module 915. The scrambler 910 may scramble the data 902 to reduce the probability of long sequences of zeros or ones. The scrambler 910 may use a seed to determine the scrambled bits. The seed may be known or shared with the receiving WLAN device so that the receiving WLAN device can reverse the scrambling process performed by the scrambler 910. After scrambling, the data may be processed by the encoding module 915.

The encoding module 915 may perform encoding for error correction and error detection. For example, the encoding module 915 may perform FEC and add redundancy or CRC bits to the source data. The encoder may use BCC to encode the data. The encoded data may be sent to a stream parser 920 that divides the encoded data into $N_{SS}$ spatial streams. In some implementations, there may only be one spatial stream and the stream parser 920 may be unused. An example of spatial stream processing 940 may include an interleaver 930, and a constellation mapper 935. The interleaver 930 interleaves the bits of each spatial stream (changes order of bits) to prevent long sequences of adjacent noisy bits from entering the BCC decoder. The interleaver 930 may be present in transmitter designs that use BCC encoding. When LDPC encoding is used (rather than BCC), the interleaver 930 may be omitted. Interleaving is applied only when BCC encoding is used. The constellation mapper 935 maps the sequence of bits in each spatial stream to constellation points (complex numbers). The constellation mapper 935 may perform the modulation of the bits. For example, the constellation mapper 935 may determine the constellation points for modulation based on a modulation scheme.

After the spatial streams are processed, a spatial mapping unit 945 may map space-time streams to $N_{TX}$ transmit chains (including TX chain 950). There may be different ways of mapping the streams to transmit chains. For example, in a direct mapping the constellation points from each space-time stream may be mapped directly onto the transmit chains (one-to-one mapping). Another example may use spatial expansion, in which vectors of constellation points from all the space-time streams are expanded via matrix multiplication to produce the input to all of the transmit chains. The spatial mapping unit 945 may support beamforming (like spatial expansion), in which each vector of constellation points from all of the space-time streams is multiplied by a matrix of steering vectors to produce the input to the transmit chains.

The example transmitting WLAN device 900 may include a link adaptation testing signal generator 905 configured to send a link adaptation testing signal for transmission by the transmitter apparatus. The link adaptation testing signal may be sent in lieu of the data 902 or may be sent as an added part of a same packet that includes the data 902. In some implementations, the link adaptation testing signal generator 905 may send the link adaptation testing signal to the encoding module 915 as part of, or in lieu of, a source data stream. In some other implementations, the link adaptation testing signal generator 905 may send the link adaptation testing signal to the spatial mapping unit 945 as part of, or in lieu of, the $N_{SS}$ spatial streams. Alternatively, or additionally, the link adaptation testing signal generator 905 may send the link adaptation testing signal directly to the TX chains (such as TX chain 950).

Each TX chain 950 may prepare a plurality of OFDM symbols based on the constellation points. For example, the TX chain 950 may include an inverse discrete Fourier transform (IDFT) that converts a block of constellation points to a time domain block. The TX chain 950 may include a cyclic shift (CSD), guard interval inserter, and an analog front end to transmit OFDM symbols as radio frequency (RF) energy.

The transmitting WLAN device 900 described in FIG. 9A is only one example of a transmitter apparatus. Other block diagrams may add or remove functional blocks.

Figure 9B:
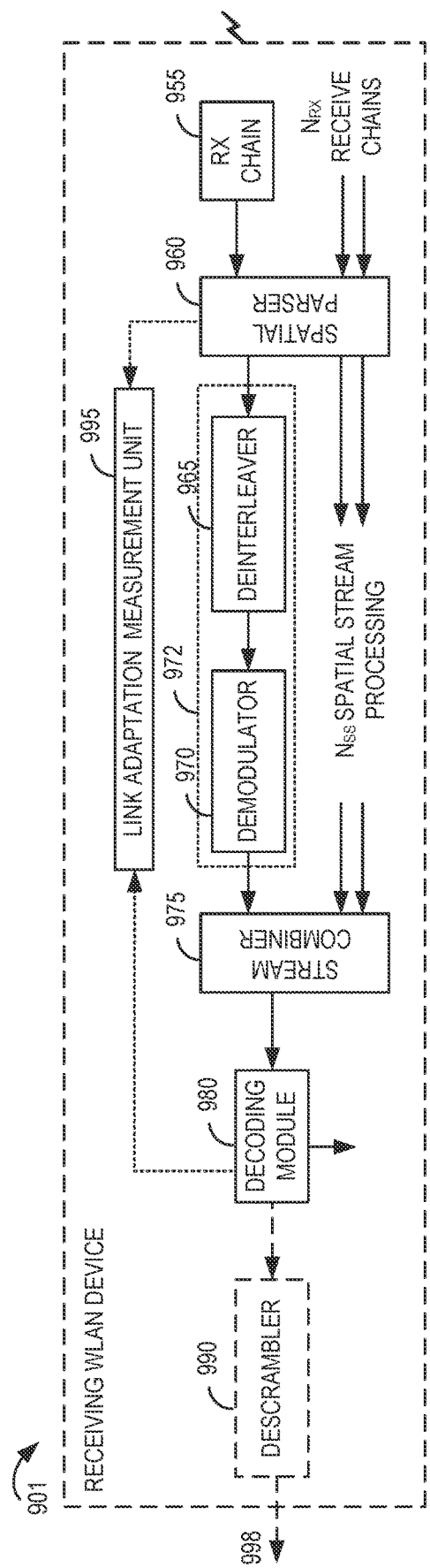
FIG. 9B depicts a block diagram of an example receiving WLAN device that supports link adaptation.

FIG. 9B depicts a block diagram of an example receiving WLAN device that supports link adaptation. The example receiving WLAN device 901 is one of many possible designs for second WLAN device. In the example of FIG. 9B, RF energy may be received by an analog front end of a receive (RX) chain 955. For example, the RX chain 955 may include an antenna and automatic gain control (AGC) components (not shown). Furthermore, the RX chain 955 may include a fast Fourier transform (FFT) function to convert time domain symbols to a frequency domain representation of received data. $N_{RX}$ receive chains may prepare frequency domain representations of received data associated with each RX chain. Each receive chain may be sent to a spatial parser 960 that converts frequency domain representations of the received signals into a plurality of spatial streams. As a result, the spatial parser 960 may prepare $N_{SS}$ spatial streams for spatial stream processing. Spatial stream processing may be used when recovering data from a plurality of spatial streams. An example of spatial stream processing 972 may include a deinterleaver 965 and a demodulator 972. If BCC interleaver was used in the transmitting WLAN device 900, the deinterleaver 965 may perform a de-interleaving of the bitstream to recover an original ordering of the bitstream. The demodulator 970 may use LLR calculations to recover a bit stream.

The example receiving WLAN device 901 may include a link adaptation measurement unit 995 to process a received testing signal. For example, the link adaptation measurement unit 995 may receive the link adaptation testing signals from of the spatial parser 960 or directly from the RX chains (such as RX chain 955). In some implementations, the spatial parser 960 may send the spatial streams related to link adaptation testing signals to the link adaptation measurement unit 995. The link adaptation measurement unit 995 may determine one or more link quality metrics based on the received link adaptation testing signal.

If the first packet includes user data, the user data may be recovered by remaining modules of the example receiving WLAN device 901, such as a stream combiner 975, a decoding module 980, and so on. The stream combiner 975 may reverse the process of the stream parser 920 of the transmitter. For example, the stream combiner 975 may combine bitstreams from multiple spatial streams to prepare encoded data bits for a decoding module 980. The decoding module 980 may decode the encoded bits. In some implementations, the decoding module 980 may implement error correction using redundancy bits in the encoded bits.

In some implementations, the example receiving WLAN device 901 may be configured to receive data 998 in addition to the testing signal. The decoding module 980 may send received data to a descrambler 990. The descrambler 990 may reverse the scrambling performed by the scrambler in the transmitting WLAN device. The descrambler 990 may provide the received data 998 to an upper layer (not shown) of the example receiving WLAN device 901.

Figure 10:
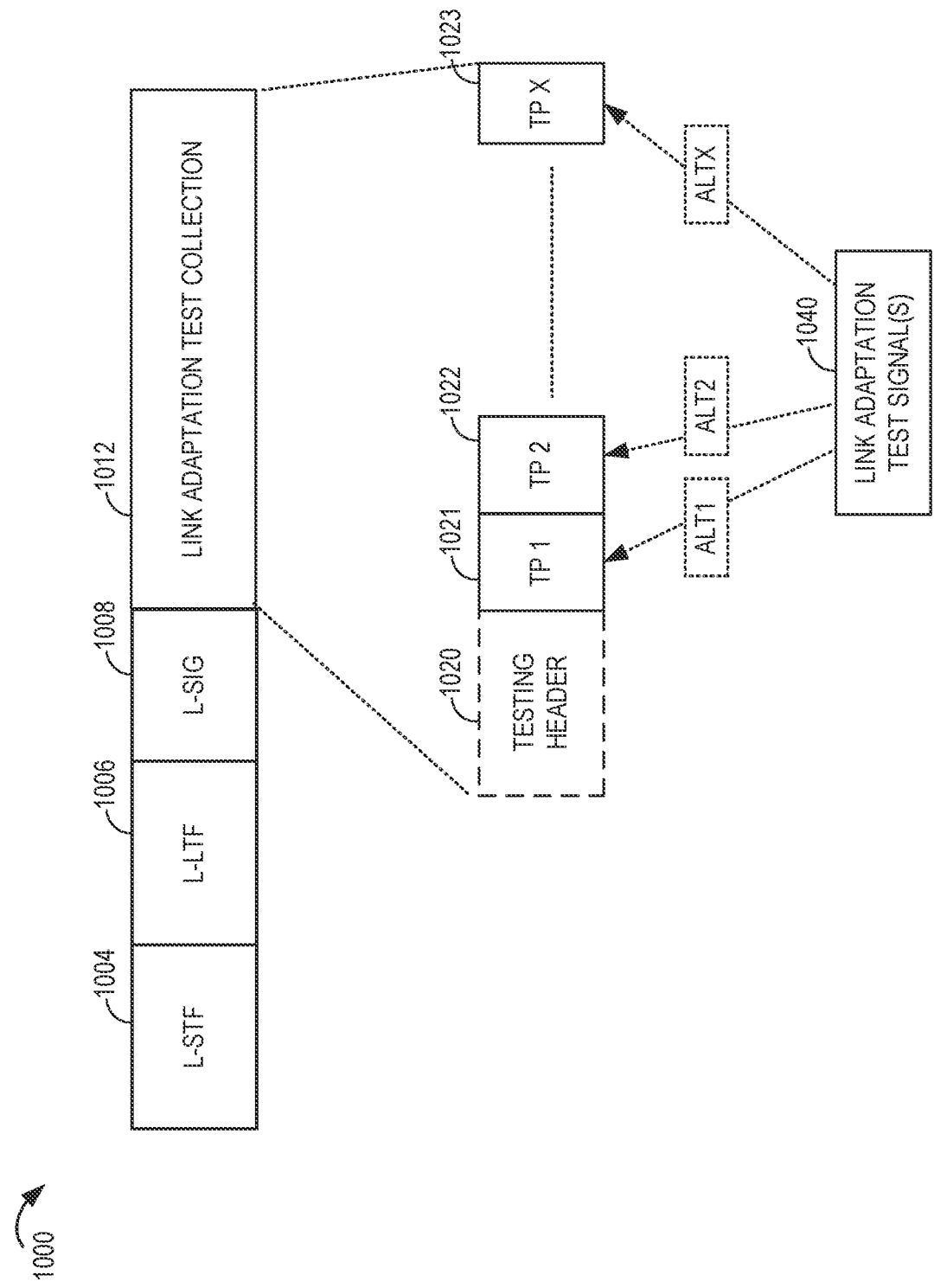
FIG. 10 depicts an example link adaptation test packet using time division for link adaptation test signals.

FIG. 10 depicts an example link adaptation test packet 1000 using time division for link adaptation test signals. For example, the link adaptation test packet 1000 can be formatted as a PPDU. As shown, the link adaptation test packet 1000 includes a preamble and a link adaptation test collection 1012. For example, the preamble may be a PHY preamble and may include a legacy portion that itself includes a legacy short training field (L-STF) 1004, a legacy long training field (L-LTF) 1006, and a legacy signaling field (L-SIG) 1008. The preamble also may include a non-legacy portion (not shown). The L-STF 1004 generally enables a receiving device to perform automatic gain control (AGC) and coarse timing and frequency estimation. The L-LTF 1006 generally enables a receiving device to perform fine timing and frequency estimation and also to estimate the wireless channel. The L-SIG 1008 generally enables a receiving device to determine a duration of the PPDU and use the determined duration to avoid transmitting on top of the PPDU. For example, the L-STF 1004, the L-LTF 1006 and the L-SIG 1008 may be modulated using a robust MCS option, such as one that uses a BPSK modulation scheme. Following the preamble, the link adaptation test packet 1000 may include one or more other headers (not shown) and the link adaptation test collection 1012. The link adaptation test collection 1012 may include a testing header 1020 to indicate which link adaptation test signal (or signals) 1040 is being used to prepare the test portions 1021, 1022, and 1023. The link adaptation test signal 1040 may be a known pattern or bit sequence (for example based on an LTF sequence, a pattern with null subcarriers, or a new SINR test pattern, among other examples). The test portions 1021, 1022, and 1023 may be based on the same link adaptation test signal 1040. In some implementations, the link adaptation test signal 1040 may be altered for each test portion. As shown in FIG. 10, the test portions may be ordered in time division in the link adaptation test collection 1012 section of the link adaptation test packet 1000. For example, the link adaptation bit sequence 1040 may have a bit rotation, tone rotation, or other alteration so that each test portion may provide some tones with a signal for signal strength measurement and some tones with null values for interference measurement. In some implementations, each test portion may be one or more OFDM symbols in a series of OFDM symbols that make up the link adaptation test packet 1000.

In some implementations, the legacy preamble of the link adaptation test packet 1000 may include a repeat of L-LTF (RL-LTF) symbol (not shown) that follows the L-LTF 1006 or the L-SIG 1008. The L-LTF and the RL-LTF may be used for noise estimation (not interference estimation) for single stream transmissions. Therefore, the link adaptation test packet 1000 may include the link adaptation test collection 1012 to enable interference estimation of multiple spatial streams. For example, the link adaptation test packet 1000 may include more LTF symbols (as the link adaptation test signal) to support link adaptation for a subsequent packet. The link adaptation test packet 1000 may include more LTF symbols (as the link adaptation test signal) than would otherwise be needed for the current packet. For example, in a normal packet, only two LTFs (the L-LTF and the RL-LTF) would be needed for MIMO transmission with two spatial streams. However, the link adaptation test packet 1000 may include additional LTFs (such as within a preamble, in a designated test portion of the packet, or at the end of the packet, among other examples) to facilitate a determination of the link quality metrics, based on the spatial stream configuration. In some implementations, the quantity of additional LTFs may be based on the quantity of spatial streams that will be included in the subsequent packet. As an example, a transmitting WLAN device may include 8 LTFs in the link adaptation test packet 1000 to support determination of the link quality metrics of the channel if the transmitting WLAN device will include 8 spatial streams in the subsequent packet. In some implementations, the L-SIG 1008 may include an indicator to indicate the quantity of LTFs (or other link adaptation test signals) included in the link adaptation test packet 1000.

FIG. 11A depicts an example link adaptation test packet 1100 in which the link adaptation test collection is included in a padding section of a data carrying packet. Similar to the link adaptation test packet 1000, the link adaptation test packet 1100 may include a preamble (such as the L-STF 1004, the L-LTF 1006, and the L-SIG 1008). However, different from the link adaptation test packet 1000, the link adaptation test packet 1100 may be a data carrying packet that includes a data payload 1110. For example, the data payload 1110 may include data for the second WLAN device. In some implementations, such as when the fast link adaptation has not yet been performed, the data payload 1110 may be modulated by a less optimal MCS option or may be modulated based on a previously selected MCS option. Following the data payload 1110, typically the PPDU would include a padding section 1112. However, in some implementations, the padding section 1112 may be populated with link adaptation test collection 1012 as described with reference to FIG. 10. For example, all or part of the padding section 1112 may be referred to as a link adaptation portion of the link adaptation test packet 1000. Although illustrated as following the data payload 1110 in FIG. 11A, in some implementations the link adaptation test collection 712 may be included before data payload 1110. The data payload 1110 may be a separate portion that is different from the link adaptation test collection in the test packet.

FIG. 11B depicts an example link adaptation test packet 1101 in which the link adaptation test collection is included in a link adaptation portion 1105 of a data carrying packet. The link adaptation portion 1105 may be populated with link quality estimation test collection 1012 as described with reference to FIG. 10. In FIG. 11B, the link adaptation portion 1105 may follow the preamble (such as the L-STF 1004, the L-LTF 1006, and the L-SIG 1008. In some implementations, the data carrying packet may include other preambles (not shown), such as a High Efficiency (HE) preamble (defined in IEEE 802.11ax), an Extremely High Throughput (EHT) preamble (defined in IEEE 802.11be), or other preambles that precede the data payload 1110. The link adaptation portion 1105 may follow the preambles and precede the data payload 1110. In some implementations, the link adaptation portion 1105 may follow the L-LTF 1006 and precede the L-SIG 1008.

Example Message Sequences for a Link Adaptation Protocol

This disclosure includes several example link adaptation message sequences that may be used for different communication types. These link adaptation message sequences are illustrative in nature and may be combined or modified within the scope of this disclosure. For brevity, the example link adaptation message sequences use some terms, such as LA-NDPA, LA-NDP, LA-FB packets which may have different names and different packet formats as described herein. Table 1 includes a listing of how some of the example link adaptation message sequences may be used for different communication types, whether for uplink or downlink transmissions.

TABLE 1

Example link adaptation message sequences for different types of communications

Figure 12:
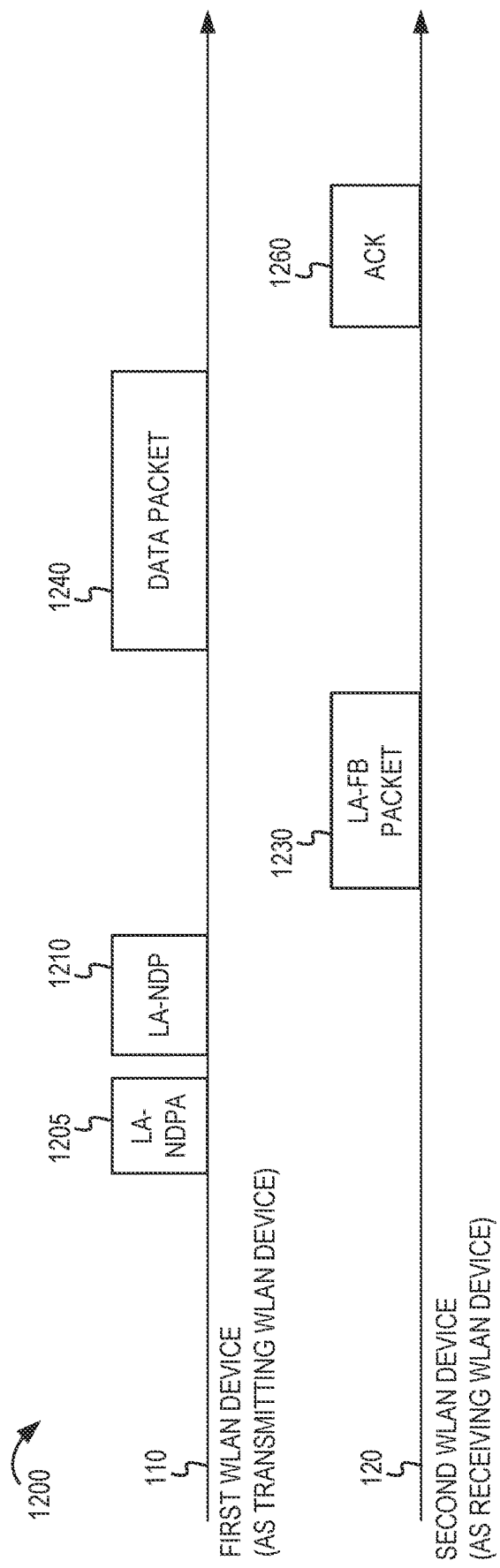
FIG. 12 shows an example link adaptation message sequence for uplink or downlink communication.
Figure 13:
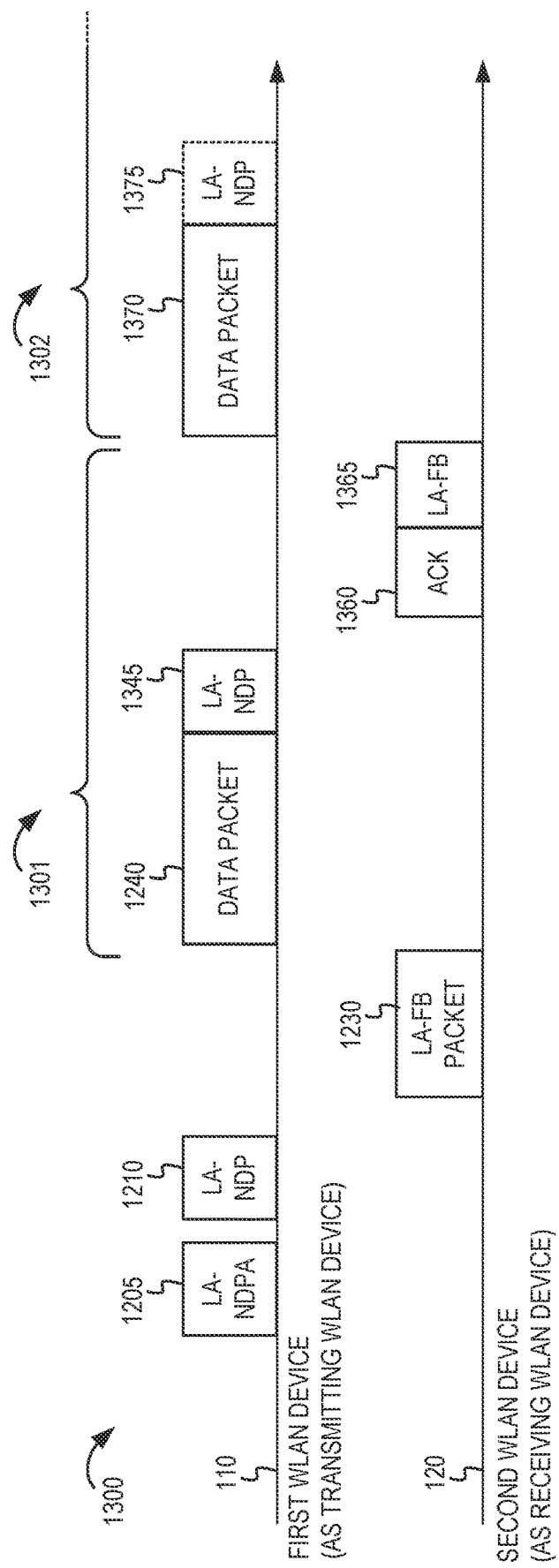
FIG. 13 shows an example link adaptation message sequence with piggybacked link adaptation test packets and link adaptation feedback packets.
Figure 14:
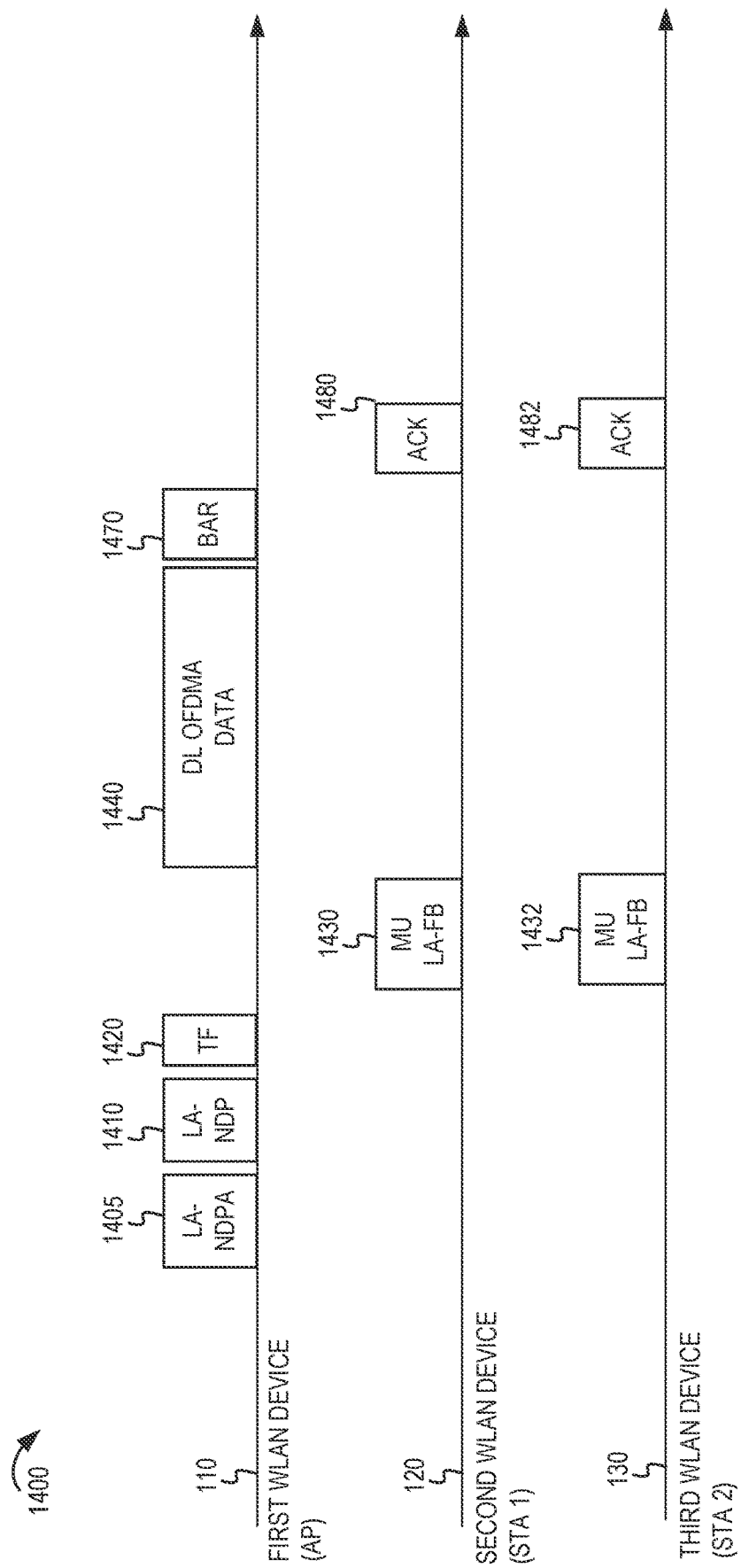
FIG. 14 shows an example link adaptation message sequence for downlink OFDMA.
Figure 15:
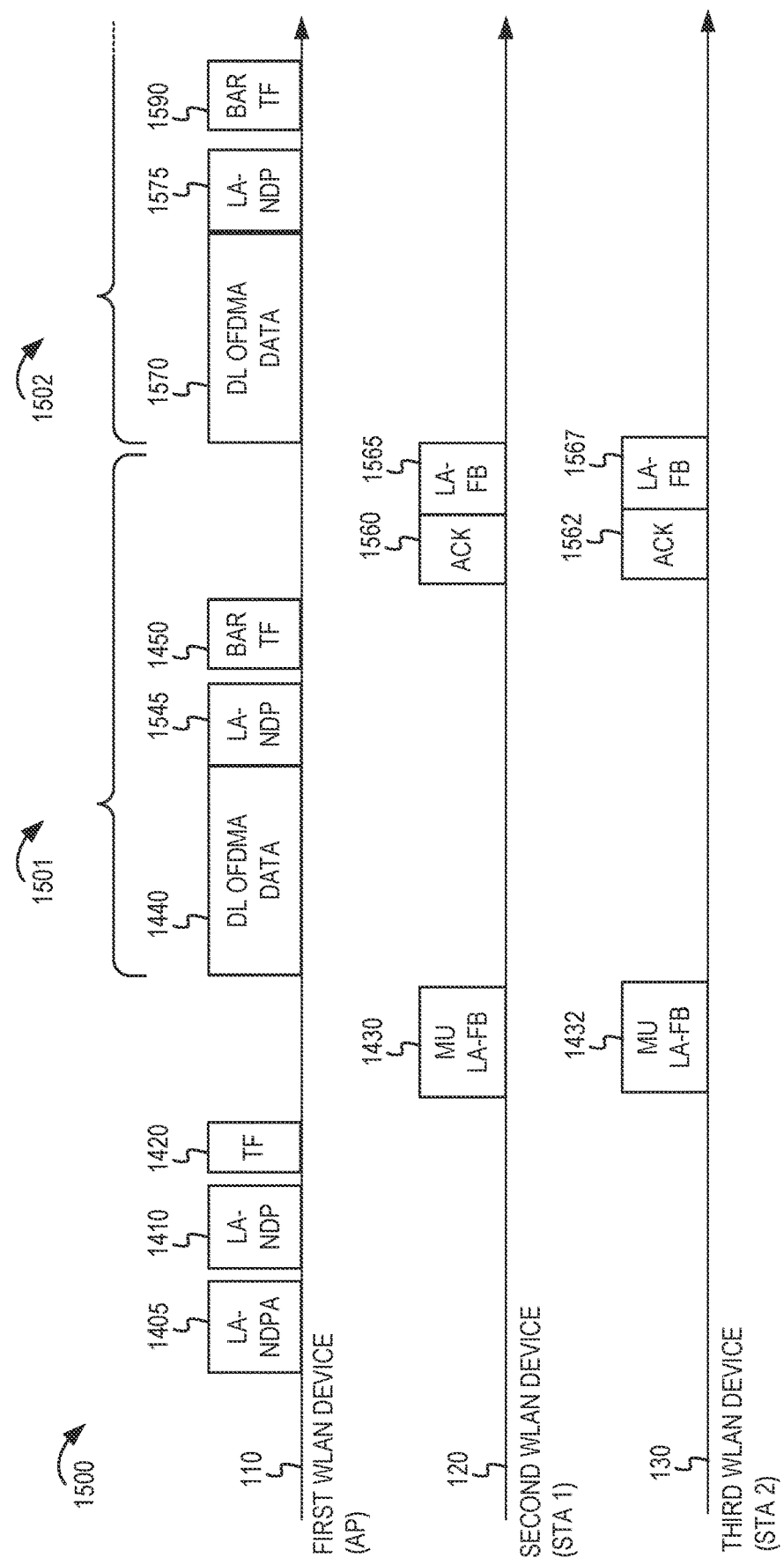
FIG. 15 shows an example link adaptation message sequence for downlink OFDMA with piggybacked link adaptation test packets and link adaptation feedback packets.
Figure 16:
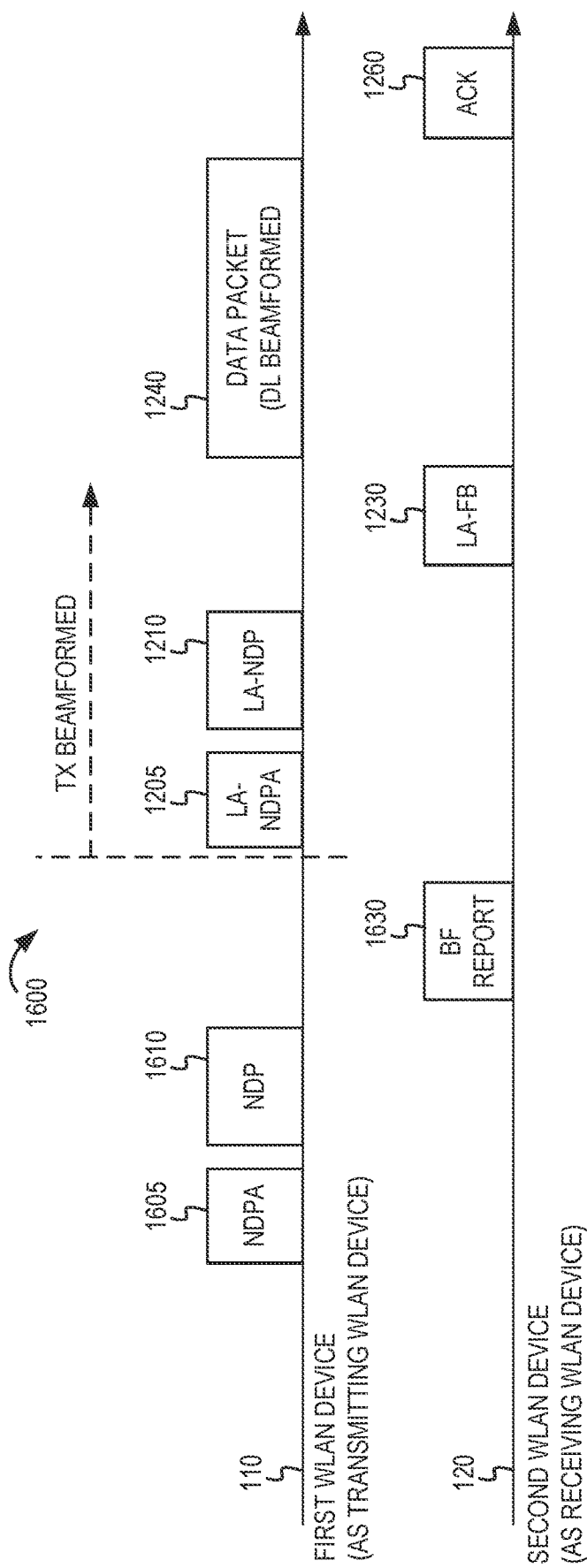
FIG. 16 shows an example link adaptation message sequence that follows a separate beamform determination sequence.
Figure 17:
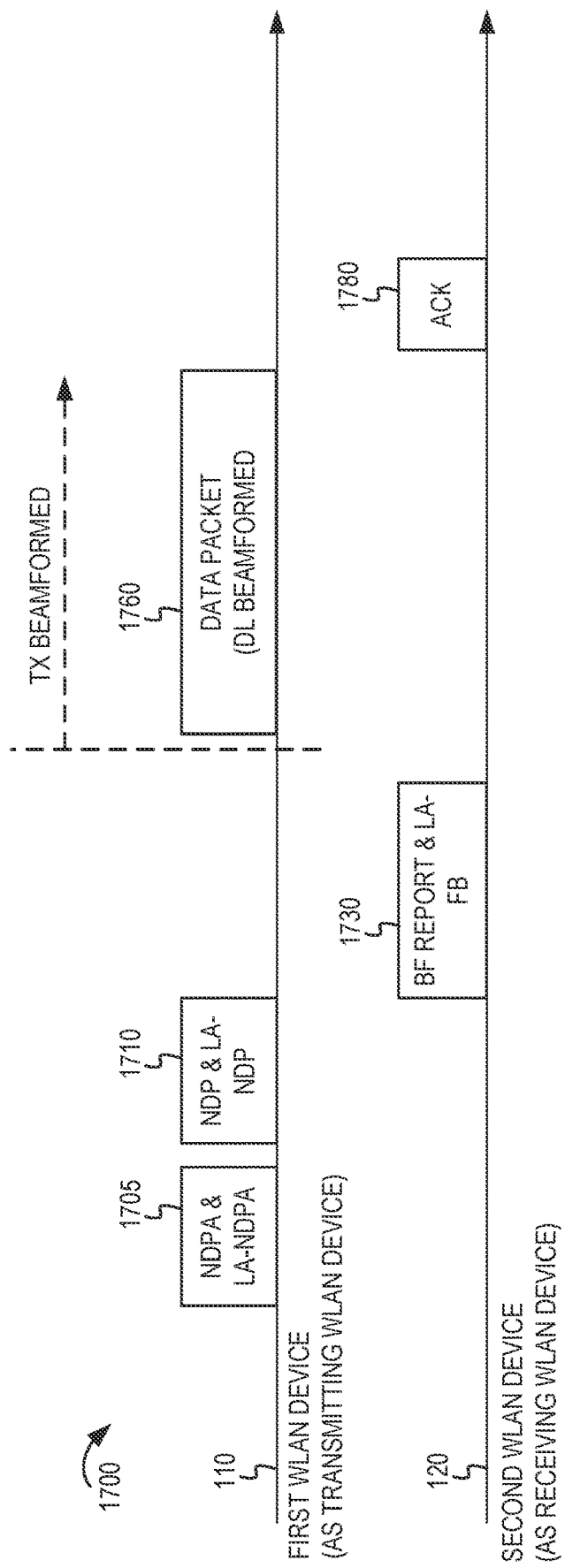
FIG. 17 shows an example link adaptation message sequence that includes a combination of the link adaptation message sequence with a beamform determination protocol.
Figure 18:
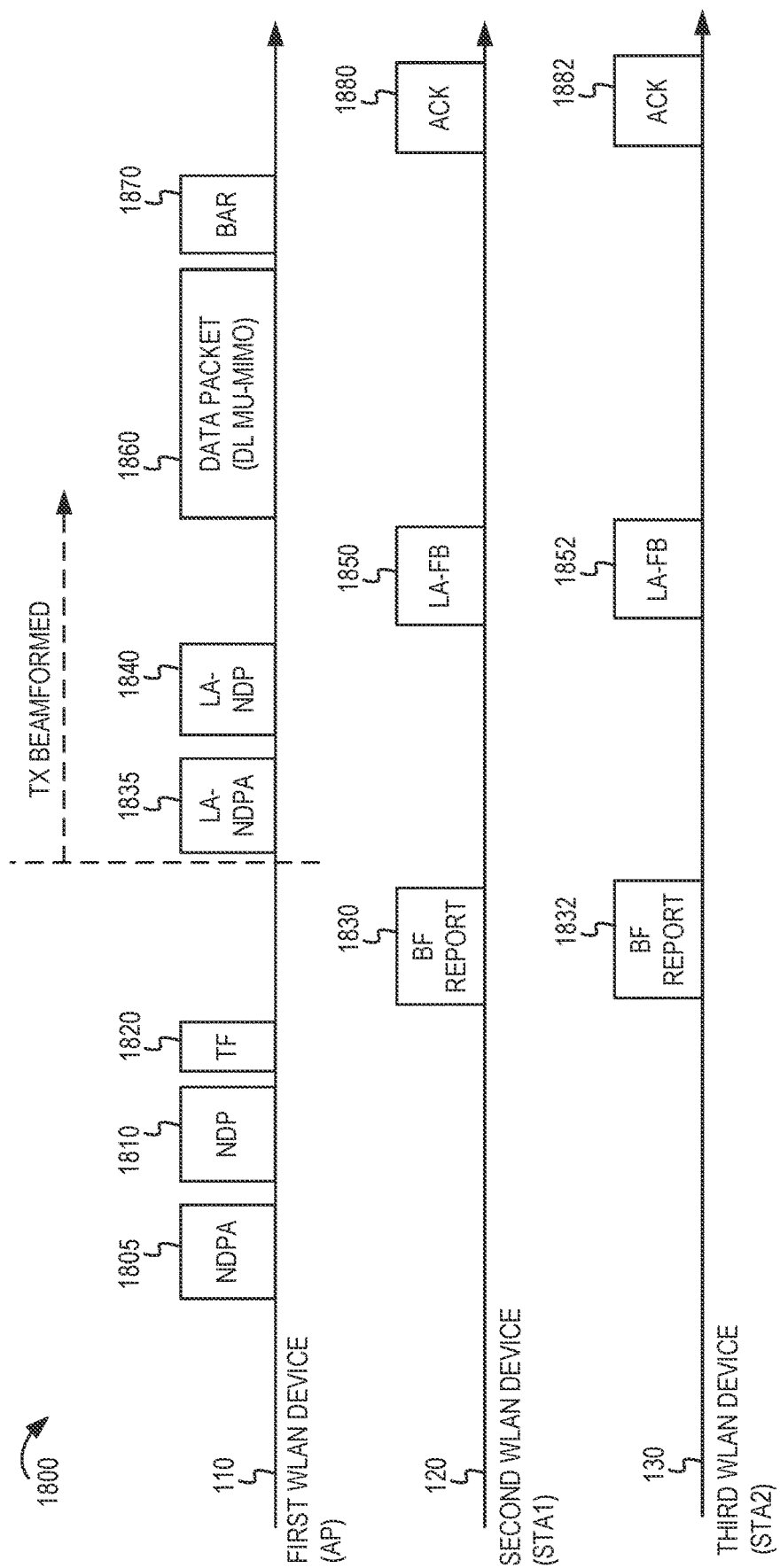
FIG. 18 shows an example link adaptation message sequence for downlink multi-user (MU) MIMO.
Figure 19:
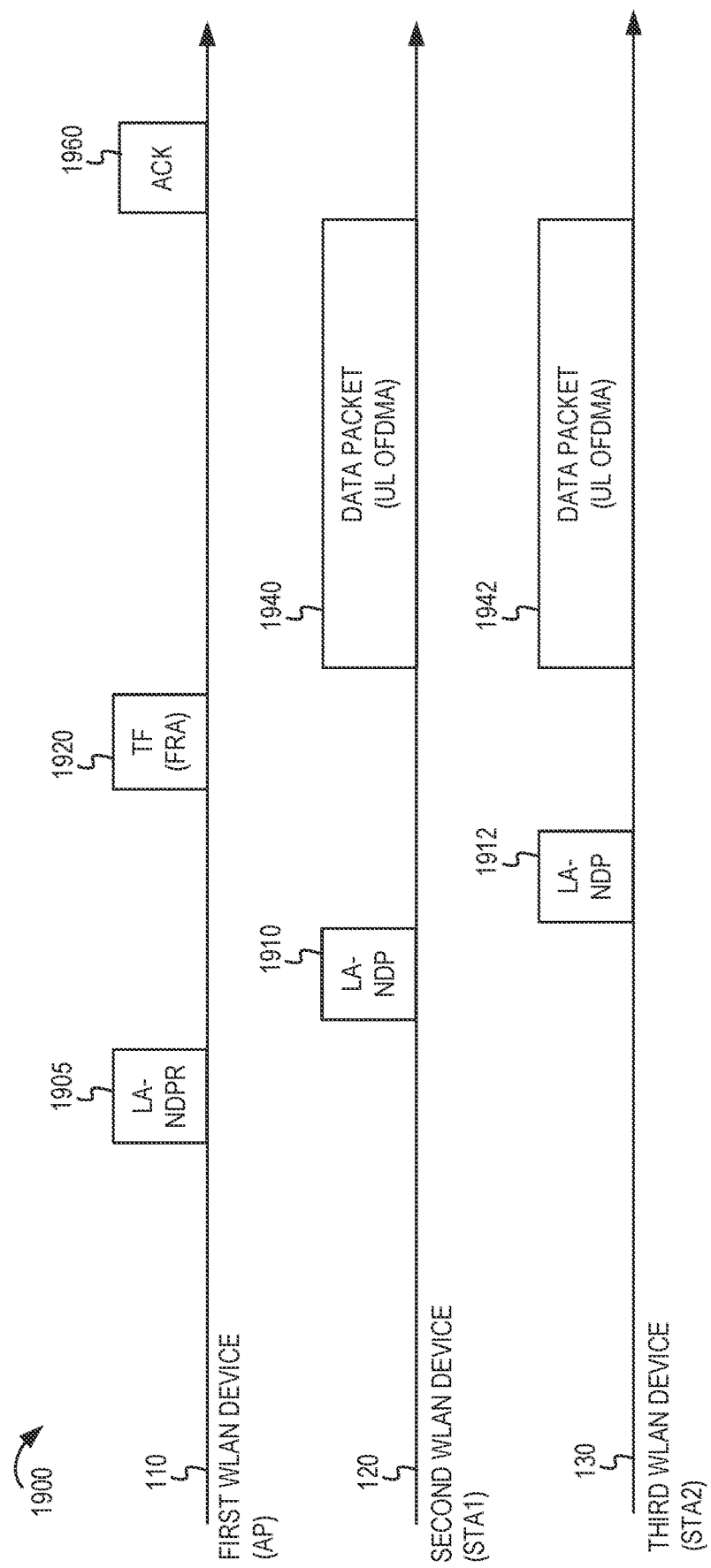
FIG. 19 shows an example link adaptation message sequence for uplink communication that supports OFDMA and MU-MIMO.
Figure 20:
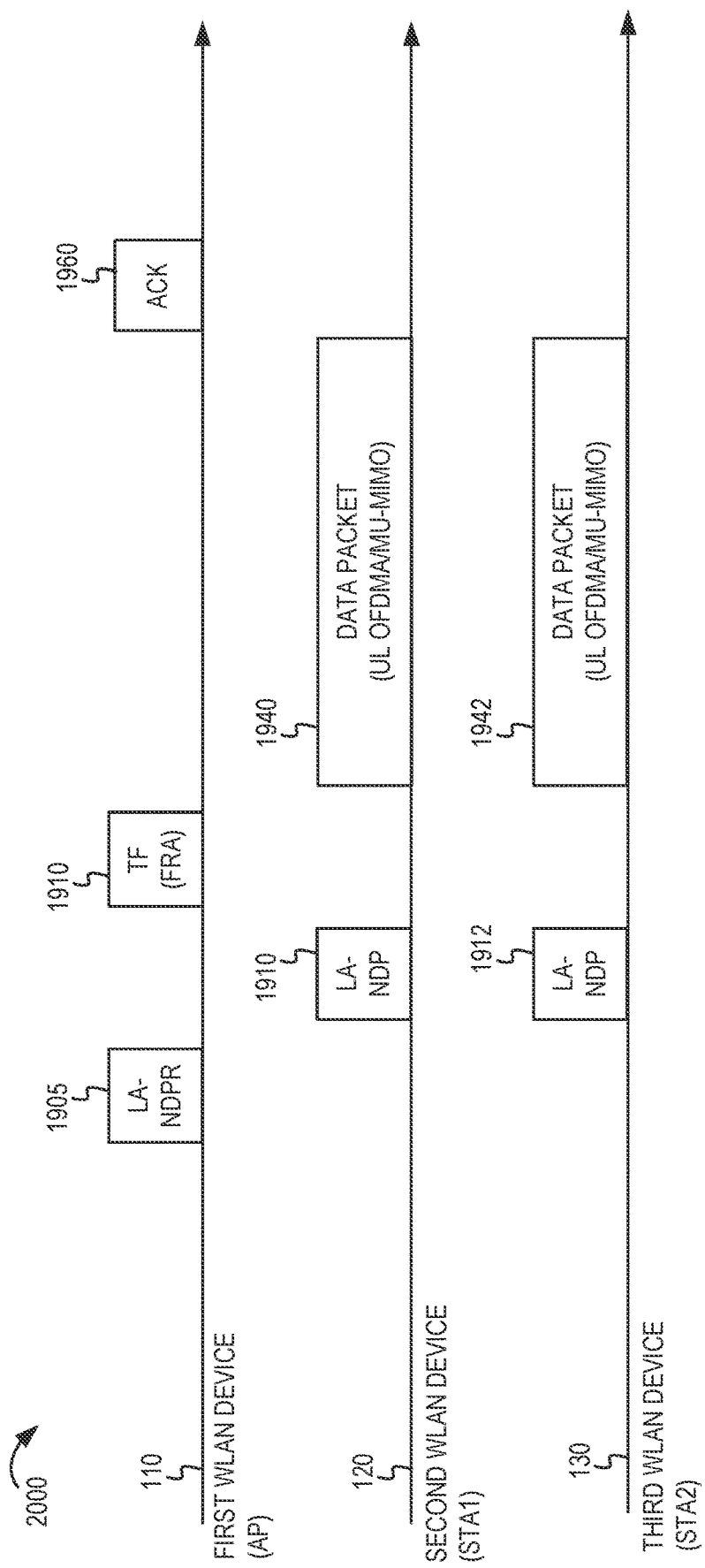
FIG. 20 shows another example link adaptation message sequence for uplink communication that supports OFDMA and MU-MIMO.

| Communication type | Downlink | Uplink |
|---|---|---|
| SU | FIG. 12 | FIG. 12 |
|  | FIG. 13 | FIG. 13 |
| OFDMA | FIG. 14 | FIG. 19 |
|  | FIG. 15 | FIG. 20 |
| beamform | FIG. 16 | FIG. 19 |
|  | FIG. 17 | FIG. 20 |
| MU-MIMO | FIG. 18 | FIG. 19 |
|  |  | FIG. 20 |

FIG. 12 shows an example link adaptation message sequence for uplink or downlink communication. The example link adaptation message sequence 1200 may be used for single user (SU) uplink or downlink communications. A first WLAN device 110 may send an LA-NDPA 1205 to indicate the start of the link adaptation message sequence and that the LA-NDP 1210 will follow. The LA-NDP 1210 is an example of a link adaptation test packet which can enable the second WLAN device 120 to determine link quality metrics (such as SINR, EVM, BER, BLER, among other examples). The second WLAN device 120 may respond with an LA-FB packet 1230 to indicate the link quality metrics or a selected transmission rate option (such as an MCS) based on the link quality metrics. If the LA-FB packet 1230 includes link quality metrics, the first WLAN device 110 may select the transmission rate option based on the link quality metrics. Otherwise, the first WLAN device 110 may determine the selected transmission rate option that is indicated in the LA-FB packet 1230. Thereafter, the first WLAN device 110 may send a data packet 1240 modulated based on the selected transmission rate option. The second WLAN device 120 may send an acknowledgment packet 1260. In some implementations, the acknowledgment packet 1260 is a block acknowledgement (BA) feedback packet.

FIG. 13 shows an example link adaptation message sequence with piggybacked link adaptation test packets and link adaptation feedback packets. The example link adaptation message sequence 1300 may be used for single user (SU) uplink or downlink communications. The link adaptation message sequence 1300 is similar to the link adaptation message sequence 1200 in FIG. 12, except that the WLAN devices can use piggybacked test packets to continuously monitor and adjust the transmission rate option for subsequent packets. For example, the LA-NDPA 1205, the LA-NDP 1210, the LA-FB packet 1230, and the data packet 1240 may operate similar to the link adaptation message sequence 1200 in FIG. 12. However, following the data packet 1240 (or as part of the data packet 1240), the first WLAN device 110 may send another LA-NDP 1345. When the second WLAN device 120 sends the acknowledgment packet 1360 (regarding the data packet 1240), the second WLAN device 120 may include another LA-FB packet 1365

(appended or as part of the acknowledgment packet 1360). Together, the data packet 1240, the LA-NDP 1345, the acknowledgment packet 1360, and the LA-FB packet 1365 may be considered one cycle 1301 of a link adaptation transmission sequence. Thereafter, the first WLAN device 110 may begin another cycle 1302, during which the first WLAN device 110 may send another data packet 1370 modulated based on a selected transmission rate option based on the LA-FB packet 1365. The process may continue for each subsequent data packet (such as the data packet 1370). In some implementations, if the data packet 1370 is last data packet for the session (as determined by completion of data traffic in the queue to send from the first WLAN device 110 to the second WLAN device 120), the LA-NDP 1375 may be omitted. The use of piggybacked link adaptation packets and feedback may permit the WLAN devices to continuously monitor and optimize the transmission rate selection for a session that may include multiple cycles of data transmission. Each cycle can include the LA-FB that may cause adjustments to the next cycle. Although the LA-NDP 1345 and the data packet 1240 are illustrated and described as separate packets, they may be combined together in a single packet, such as the link adaptation test packets 1100 and 1101 described with reference to FIGS. 11A and 11B, respectively.

FIG. 14 shows an example link adaptation message sequence for downlink OFDMA. The example link adaptation message sequence 1400 may be used for OFDMA downlink communications. A first WLAN device 110 may send an LA-NDPA 1405 to indicate the start of the link adaptation message sequence and that the LA-NDP 1410 will follow. In OFDMA, since the first WLAN device 110 (such as the AP) manages the channel use, the trigger frame 1420 (or the LA-NDPA 1405) may indicate which RUs for the STAs (such as the second WLAN device 120 and a third WLAN device 130) to monitor or which RUs for the STAs to use for the uplink feedback. The second WLAN device 120 and the third WLAN device 130 may respond with LA-FB packets 1430 and 1432, respectively, to indicate the link quality metrics or a selected transmission rate option based on the link quality metrics. Although the LA-FB packets 1430 and 1432 are illustrated as concurrent multi-user (MU) OFDMA transmissions in FIG. 14, in some implementations, the LA-FB packets may be sent sequentially by the second WLAN device 120 and the third WLAN device 130. In some implementations, the trigger frame 1420 may indicate a timing or sequential listing for the WLAN devices 120 and 130 to send the LA-FB packets.

In some implementations, the STAs (the second WLAN device 120 and the third WLAN device 130) may observe a full channel of the LA-NDP 1410 and the LA-FB packets 1430 and 1432 may include link quality metrics for portions of the full channel. In such implementations, the first WLAN device 110 may also determine RU allocations (in addition to selected transmission rate) for the STAs based on the link quality metrics. Thus, the subsequent packet 1440 (which may be a DL OFDMA transmission) may indicate particular RUs for each of the STAs to optimize the RU allocation and the transmission rate option.

Following the subsequent packet 1440, the first WLAN device 110 may send a block ack request (BAR) message 1470 as a trigger to cause the STAs to send acknowledgements 1480 and 1482.

FIG. 15 shows an example link adaptation message sequence 1500 for downlink OFDMA with piggybacked link adaptation testing packets and link adaptation feedback packets. As described in FIG. 14, the link adaptation message sequence 1500 may begin with the LA-NDPA 1405, the trigger frame 1420, the trigger frame 1420, the LA-FB packet 1430, and the LA-FB packet 1432. In a first cycle 1501, the first WLAN device 110 may send a data packet 1440 modulated based on the selected transmission rate option determined from the LA-FB packets 1430 and 1432. The first WLAN device 110 may append or include another LA-NDP 1545 with the subsequent packet 1440 and before sending the BAR 1450. When the STAs (the second WLAN device 120 and the third WLAN device 130) send acknowledgement packets 1560 and 1562, respectively, they may include another LA-FB packet 1565 and 1567, respectively. Thus, during a next cycle 1502, the first WLAN device 110 may adapt the transmission rate based on the new LA-FB packets 1565 and 1567. The next cycle 1502 may include a new data packet 1570, optionally followed by another LA-NDP 1575 and BAR 1590.

FIG. 16 shows an example link adaptation message sequence 1600 that follows a separate beamform determination sequence. Before performing the link adaptation message sequence 1600, the first WLAN device 110 and the second WLAN device 120 may determine beamforming configuration for the channel. For example, the first WLAN device 110 may send a traditional NDPA 1605 and NDP 1610 intended to solicit a beamforming report 1630 from the second WLAN device 120. The beamforming report 1630 may include beamforming information that is used to determine, among other things, the beamforming configuration for multiple antennas of the first WLAN device 110. Thereafter, the link adaptation message sequence 1600 may use beamformed transmissions from the first WLAN device 110 to the second WLAN device 120 based on the beamforming configuration. The example link adaptation message sequence 1600 may be similar to the message sequences in FIG. 12, 13, 14, or 15. For example, the first WLAN device 110 may send an LA-NDPA 1205 to indicate the start of the link adaptation message sequence and that the LA-NDP 1210 will follow. The LA-NDP 1210 is an example of a fast link adaptation test packet which can enable the second WLAN device 120 to determine link quality metrics (such as SINR, BER, BLER, among other examples). The second WLAN device 120 may respond with an LA-FB packet 1230 to indicate the link quality metrics or a selected transmission rate option based on the link quality metrics. If the LA-FB packet 1230 includes link quality metrics, the first WLAN device 110 may select the transmission rate option based on the link quality metrics. Otherwise, the first WLAN device 110 may determine the selected transmission rate option that is indicated in the LA-FB packet 1230. Thereafter, the first WLAN device 110 may send a data packet 1240 modulated based on the selected transmission rate option. The second WLAN device 120 may send an acknowledgment packet 1260. In some implementations, the acknowledgment packet 1260 is a block acknowledgement (BA) feedback packet.

FIG. 17 shows an example link adaptation message sequence 1700 that includes a combination of the link adaptation message sequence with a beamform determination sequence. The first WLAN device 110 may send a combined NDP and LA-NDPA 1705 to indicate the start of the link adaptation message sequence and that the combined NDP and LA-NDP 1710 will follow. The combined NDP and LA-NDP 1710 may enable the second WLAN device 120 to determine beamforming information as well as link quality metrics in the same test packet. The second WLAN device 120 may respond with a combined BF report and LA-FB 1730. The beamforming information is used to determine, among other things, the beamforming configuration for multiple antennas of the first WLAN device 110. The LA-FB is used to select a transmission rate option for the subsequent packet 1760. Thereafter, the first WLAN device 110 may send a data packet 1760 modulated based on the selected transmission rate option and beamformed based on the beamforming configuration. The second WLAN device 120 may send an acknowledgment packet 1780.

FIG. 18 shows an example link adaptation message sequence 1800 for downlink multi-user (MU) MIMO. A traditional NDPA 1805 and traditional NDP 1810 are followed by a trigger frame 1820 to prompt the second WLAN device 120 and the third WLAN device 130 to send BF reports 1830 and 1832, respectively. These messages are used to determine beamforming configurations for the DL MU-MIMO transmission 1860. Before sending the DL MU-MIMO transmission 1860, the first WLAN device 110 may send an LA-NDPA 1835 and LA-NDP 1840 to be used by the STAs to determine link quality metrics. The LA-NDP 1840 in this example may also serve as a trigger frame for the LA-FB packets 1850 and 1852 from the second WLAN device 120 and the third WLAN device 130, respectively. Based on the LA-FB packets 1850 and 1852, the first WLAN device 110 may determine transmission rate options for each of the STAs. A BAR 1870 may follow the MU-MIMO transmission 1860 and cause the STAs to send back acknowledgements 1880 and 1882.

FIG. 19 shows an example link adaptation message sequence 1900 for uplink communication that supports OFDMA and MU-MIMO. In OFDMA and MU-MIMO, the first WLAN device 110 (such as the AP) may control the channel usage based on trigger frames or other scheduling messages. In the example of FIG. 19, the first WLAN device 110 may send a link adaptation null data packet request (LA-NDPR) packet 1905 to cause the STAs (the second WLAN device 120 and the third WLAN device 130) to send LA-NDPs 1910 and 1912. The LA-NDPs 1910 and 1912 may be sent sequentially (as shown in FIG. 19) or concurrently (as shown in FIG. 20). In some implementations, the packet 1905 may indicate a sequential order for the LA-NDPs 1910 and 1912. Thereafter, the first WLAN device 110 may send a trigger frame 1920 to prompt the STAs to send an UL OFDMA transmission with data 1940 and 1942 from the second WLAN device 120 and the third WLAN device 130, respectively. The trigger frame 1920 may include RU allocations, transmission rate option selections, or other link adaptation information used by the second WLAN device 120 and the third WLAN device 130 to optimize the transmission rate selected for the uplink data transmission. The first WLAN device 110 may send an acknowledgement 1960 after receiving and processing the UL OFDMA transmission.

FIG. 20 shows another example link adaptation message sequence for uplink communication that supports OFDMA and MU-MIMO. FIG. 20 is similar to FIG. 19, except that the LA-NDP packets 1910 and 1912 may be sent concurrently using OFDMA or MU-MIMO.

Figure 21:
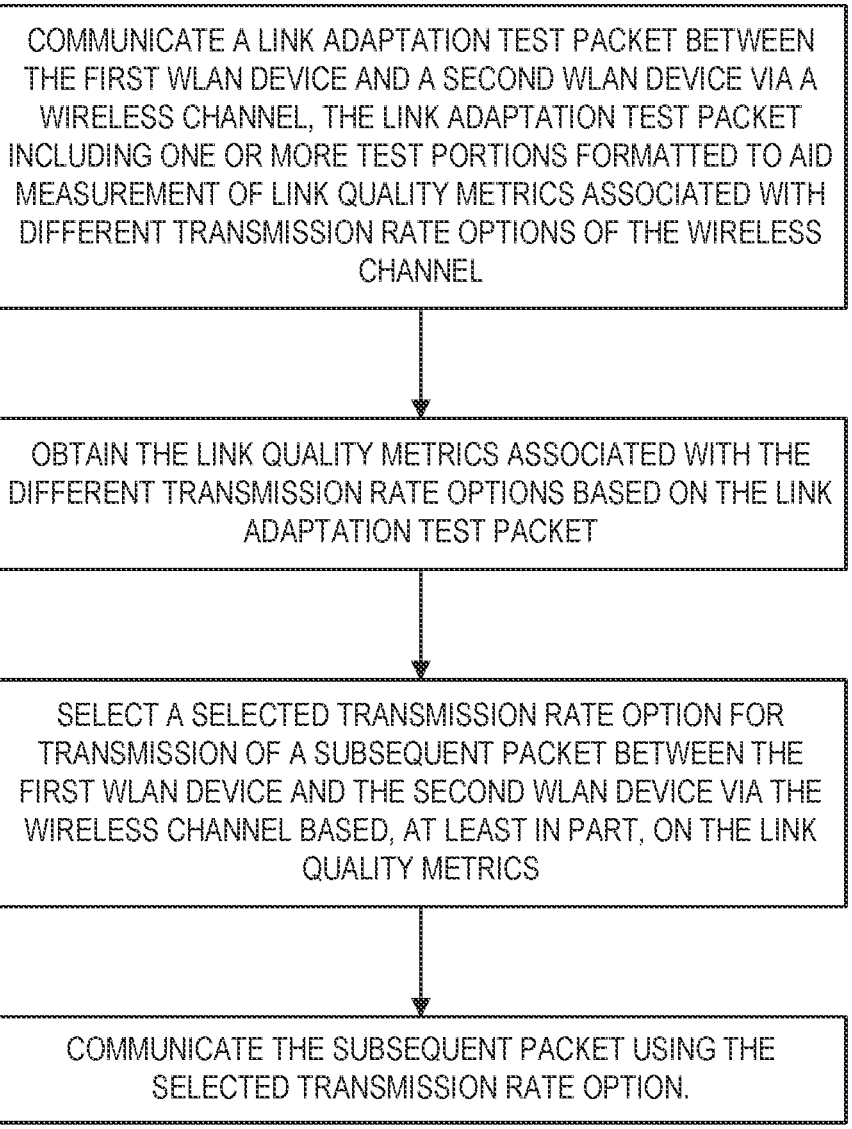
FIG. 21 shows a flowchart illustrating an example process by a transmitting WLAN device to support link adaptation.

FIG. 21 shows a flowchart illustrating an example process 2100 by transmitting WLAN device to support link adaptation. In some implementations, the process 2100 may be performed by a first WLAN device such as the AP 102, the first WLAN device 110, the second WLAN device 120, the STA 144, the wireless communication device 2300, the AP 2402, or the STA 2404 described herein.

In block 2110, the first WLAN device may communicate a link adaptation test packet between the first WLAN device and a second WLAN device via a wireless channel, the link adaptation test packet including one or more test portions formatted to aid measurement of link quality metrics associated with different transmission rate options of the wireless channel.

In block 2120, the first WLAN device may obtain the link quality metrics associated with the different transmission rate options based on the link adaptation test packet.

In block 2130, the first WLAN device may select a selected transmission rate option for transmission of a subsequent packet between the first WLAN device and the second WLAN device via the wireless channel based, at least in part, on the link quality metrics.

In block 2140, the first WLAN device may communicate the subsequent packet using the selected transmission rate option.

FIG. 22 shows a flowchart illustrating an example process 2200 to support link adaptation for an uplink communication. In some implementations, the process 2200 may be performed by a receiving WLAN device such as the second WLAN device 120, the STA 144, the wireless communication device 2300, or the STA 2404 described herein In block 2210, the receiving WLAN device may receive a link adaptation test packet from an access point (AP) of the WLAN via a wireless channel. The link adaptation test packet may include one or more test portions formatted to aid measurement of link quality metrics associated with different transmission rate options of the wireless channel.

In block 2220, the receiving WLAN device may measure the link quality metrics associated with the different transmission rate options based on the link adaptation test packet.

In block 2230, the receiving WLAN device may transmit link adaptation feedback to the AP based, at least in part, on the link quality metrics.

In block 2240, the receiving WLAN device may receive a subsequent packet formatted according to a transmission rate option selected by the AP based on the link adaptation feedback.

Figure 23:
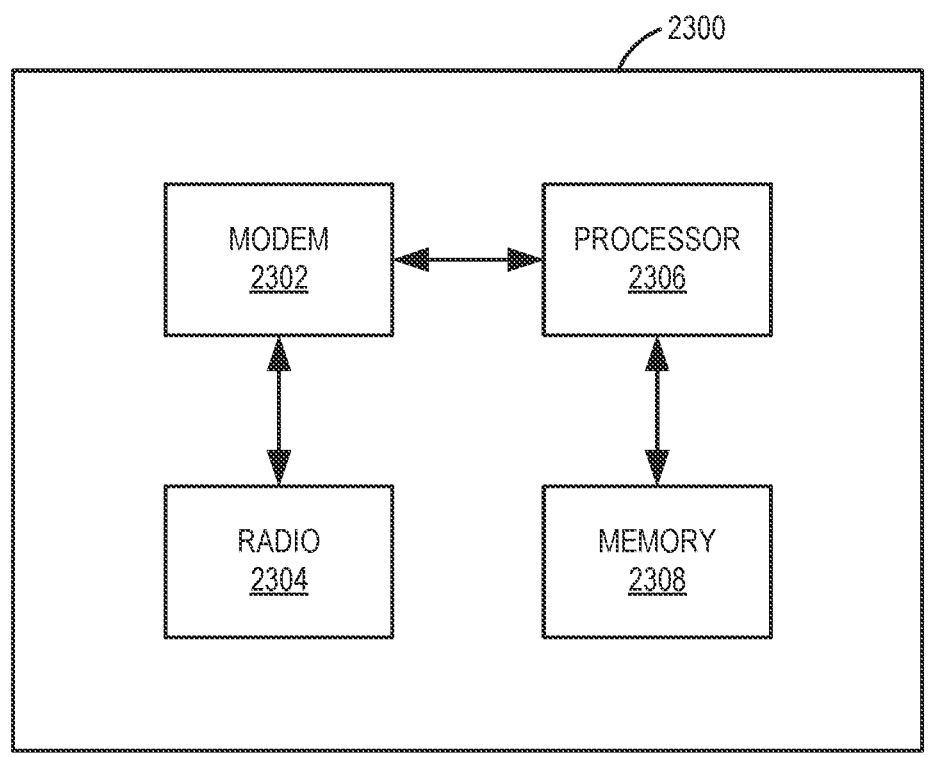
FIG. 23 shows a block diagram of an example wireless communication device.

FIG. 23 shows a block diagram of an example wireless communication device 2300. In some implementations, the wireless communication device 2300 can be an example of a device for use in a STA such as one of the STAs 104 or 144 described above with reference to FIG. 1. In some implementations, the wireless communication device 2300 can be an example of a device for use in an AP such as the AP 102 described above with reference to FIG. 1. The wireless communication device 2300 may be used as a transmitting WLAN device or receiving WLAN device (such as the first WLAN device 110 and the second WLAN device 120, respectively). The wireless communication device 2300 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 2300 can be, or can include, a chip, system on chip (SoC), chipset, package or device that includes one or more modems 2302, for example, a Wi-Fi (IEEE 802.11 compliant) modem. In some implementations, the one or more modems 2302 (collectively "the modem 2302") additionally include a WWAN modem (for example, a 3GPP 4G LTE or 5G compliant modem). In some implementations, the wireless communication device 2300 also includes one or more radios 2304 (collectively "the radio 2304"). In some implementations, the wireless communication device 2300 further includes one or more processors, processing blocks or processing elements 2306 (collectively "the processor 2306") and one or more memory blocks or elements 2308 (collectively "the memory 2308").

The modem 2302 can include an intelligent hardware block or device such as, for example, an application-specific integrated circuit (ASIC) among other possibilities. The modem 2302 is generally configured to implement a PHY layer. For example, the modem 2302 is configured to modulate packets and to output the modulated packets to the radio 2304 for transmission over the wireless medium. The modem 2302 is similarly configured to obtain modulated packets received by the radio 2304 and to demodulate the packets to provide demodulated packets. In addition to a modulator and a demodulator, the modem 2302 may further include digital signal processing (DSP) circuitry, automatic gain control (AGC), a coder, a decoder, a multiplexer and a demultiplexer. For example, while in a transmission mode, data obtained from the processor 2306 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 2304. In implementations involving beamforming, the modulated symbols in the respective spatial streams are precoded via a steering matrix prior to their provision to the IFFT block.

While in a reception mode, digital signals received from the radio 2304 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 2306) for processing, evaluation, or interpretation.

The radio 2304 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 2300 can include, or be coupled with, multiple transmit antennas (each with a corresponding transmit chain) and multiple receive antennas (each with a corresponding receive chain). The symbols output from the modem 2302 are provided to the radio 2304, which then transmits the symbols via the coupled antennas. Similarly, symbols received via the antennas are obtained by the radio 2304, which then provides the symbols to the modem 2302.

The processor 2306 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 2306 processes information received through the radio 2304 and the modem 2302, and processes information to be output through the modem 2302 and the radio 2304 for transmission through the wireless medium. For example, the processor 2306 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 2306 may generally control the modem 2302 to cause the modem to perform various operations described above.

The memory 2308 can include tangible storage media such as random-access memory (RAM) or read-only memory (ROM), or combinations thereof. The memory 2308 also can store non-transitory processor- or computer-executable software (SW) code containing instructions that, when executed by the processor 2306, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 24B:
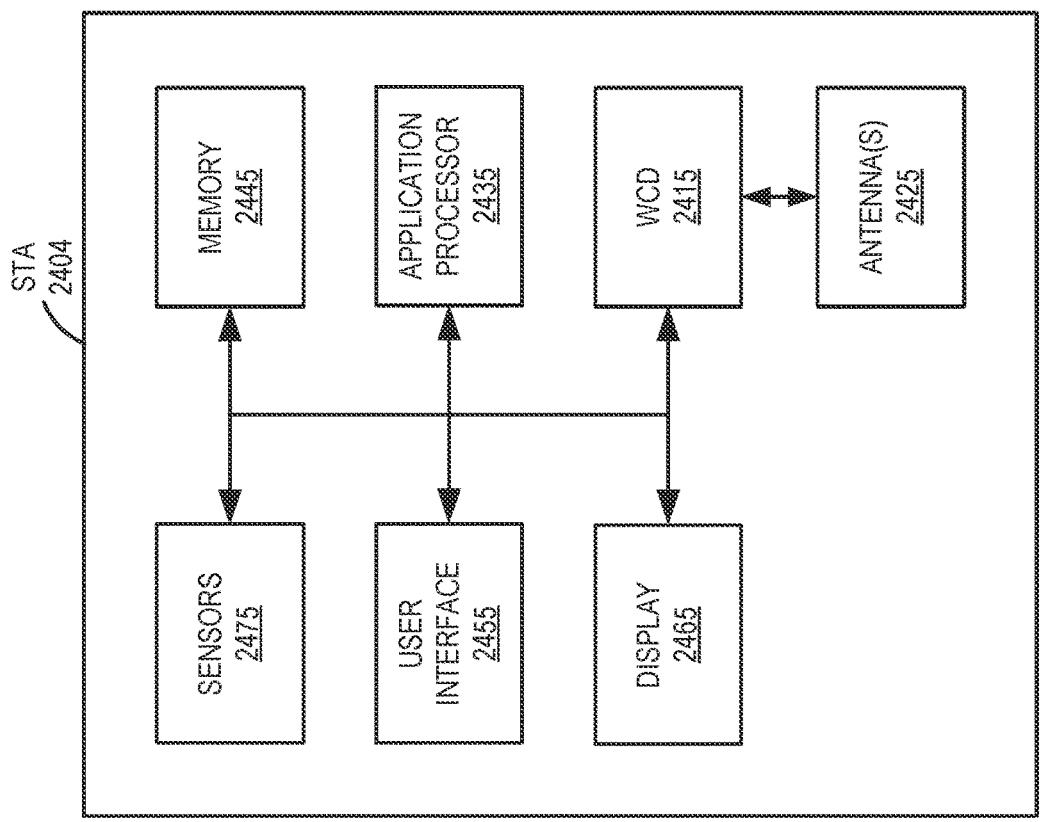
FIG. 24B shows a block diagram of an example station (STA).
Figure 24A:
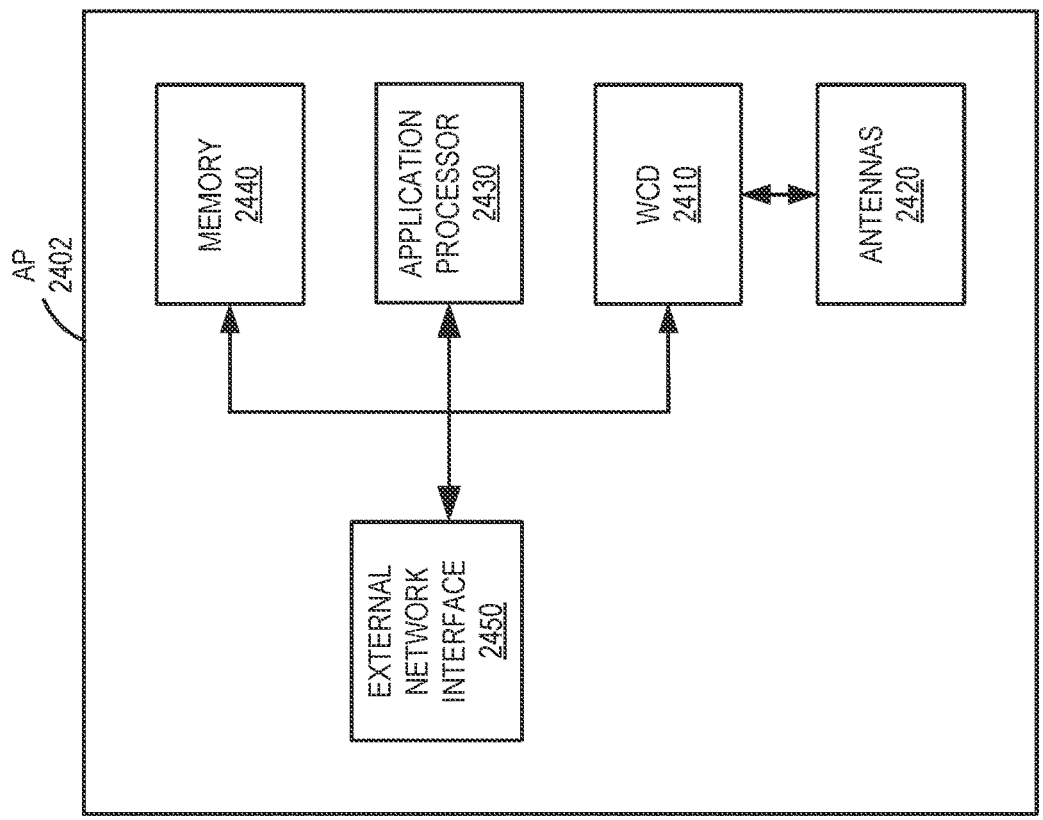
FIG. 24A shows a block diagram of an example access point (AP).

FIG. 24A shows a block diagram of an example AP 2402. For example, the AP 2402 can be an example implementation of the AP 102 described with reference to FIG. 1. The AP 2402 includes a wireless communication device (WCD) 2410 (although the AP 2402 may itself also be referred to generally as a wireless communication device as used herein). For example, the wireless communication device 2410 may be an example implementation of the wireless communication device 2300 described with reference to FIG. 23. The AP 2402 also includes multiple antennas 2420 coupled with the wireless communication device 2410 to transmit and receive wireless communications. In some implementations, the AP 2402 additionally includes an application processor 2430 coupled with the wireless communication device 2410, and a memory 2440 coupled with the application processor 2430. The AP 2402 further includes at least one external network interface 2450 that enables the AP 2402 to communicate with a core network or backhaul network to gain access to external networks including the Internet. For example, the external network interface 2450 may include one or both of a wired (for example, Ethernet) network interface and a wireless network interface (such as a WWAN interface). Ones of the aforementioned components can communicate with other ones of the components directly or indirectly, over at least one bus. The AP 2402 further includes a housing that encompasses the wireless communication device 2410, the application processor 2430, the memory 2440, and at least portions of the antennas 2420 and external network interface 2450.

FIG. 24B shows a block diagram of an example STA 2404. For example, the STA 2404 can be an example implementation of the STA 104 described with reference to FIG. 1. The STA 2404 includes a wireless communication device 2415 (although the STA 2404 may itself also be referred to generally as a wireless communication device as used herein). For example, the wireless communication device 2415 may be an example implementation of the wireless communication device 2300 described with reference to FIG. 23. The STA 2404 also includes one or more antennas 2425 coupled with the wireless communication device 2415 to transmit and receive wireless communications. The STA 2404 additionally includes an application processor 2435 coupled with the wireless communication device 2415, and a memory 2445 coupled with the application processor 2435. In some implementations, the STA 2404 further includes a user interface (UI) 2455 (such as a touchscreen or keypad) and a display 2465, which may be integrated with the UI 2455 to form a touchscreen display. In some implementations, the STA 2404 may further include one or more sensors 2475 such as, for example, one or more inertial sensors, accelerometers, temperature sensors, pressure sensors, or altitude sensors. Ones of the aforementioned components can communicate with other ones of the components directly or indirectly, over at least one bus. The STA 2404 further includes a housing that encompasses the wireless communication device 2415, the application processor 2435, the memory 2445, and at least portions of the antennas 2425, UI 2455, and display 2465.

FIGS. 1-24B and the operations described herein are examples meant to aid in understanding example implementations and should not be used to limit the potential implementations or limit the scope of the claims. Some implementations may perform additional operations, fewer operations, operations in parallel or in a different order, and some operations differently.

While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

One innovative aspect of the subject matter described in this disclosure can be implemented as a method performed by a first wireless local area network (WLAN) device. The method may include communicating a link adaptation test packet between the first WLAN device and a second WLAN device via a wireless channel. The link adaptation test packet may include one or more test portions formatted to aid measurement of link quality metrics associated with different transmission rate options of the wireless channel. The method may include obtaining the link quality metrics associated with the different transmission rate options based on the link adaptation test packet. The method may include selecting a selected transmission rate option for transmission of a subsequent packet between the first WLAN device and the second WLAN device via the wireless channel based on the link quality metrics. The method may include communicating the subsequent packet using the selected transmission rate option.

In some implementations, communicating refers to transmitting the link adaptation test packet and the subsequent packet from the first WLAN device to the second WLAN device. In some implementations, communicating refers to receiving the link adaptation test packet and the subsequent packet from the second WLAN device.

In some implementations, obtaining the link quality metrics includes receiving feedback information from the second WLAN device in response to the link adaptation test packet.

In some implementations, the link adaptation test packet is formatted as a link adaptation null data packet (LA-NDP) and the feedback information is received in a link adaptation feedback (LA-FB) packet.

In some implementations, the feedback information includes a field that indicates a modulation and coding scheme (MCS) option that was selected by the second WLAN device based on link quality metrics. The selected transmission rate option may be based on the MCS option selected by the second WLAN device.

In some implementations, the link adaptation test packet is part of a message sequence defined for a link adaptation protocol.

In some implementations, the method includes selecting the message sequence from among a plurality of message sequences based on a transmission type for the subsequent packet, the plurality of message sequences including different message sequences when the transmission type is one of a group consisting of a single user (SU) transmission, an orthogonal frequency division multiple access (OFDMA) transmission, and a multi-user (MU) multiple-input-multiple-output (MU-MIMO) transmission type. The method may include formatting the link adaptation test packet based, at least in part on the selected message sequence.

In some implementations, the selected message sequence includes the first WLAN device transmitting a link adaptation null data packet announcement (LA-NDPA) or link adaptation feedback request before communicating the link adaptation test packet, the LA-NDPA or link adaptation feedback request formatted to cause the second WLAN device to provide the link quality metrics regarding the link adaptation test packet.

In some implementations, the link adaptation test packet is part of a link adaptation message sequence that includes transmitting the link adaptation test packet as a piggybacked link adaptation portion of a data carrying packet from the first WLAN device to the second WLAN device and receiving the link quality metrics as part of a block acknowledgement (BA) feedback message from the second WLAN device.

In some implementations, the method may include communicating a plurality of link adaptation test packets in a corresponding plurality of data carrying packets from the first WLAN device to the second WLAN device. The method may include adjusting the selected transmission rate option based on feedback from the second WLAN device in response to one or more of the link adaptation test packets.

In some implementations, communicating the link adaptation test packet includes transmitting the link adaptation test packet from the first WLAN device to the second WLAN device as a downlink (DL) orthogonal frequency division multiple access (OFDMA) transmission. The method may include transmitting a trigger frame to cause at least the second WLAN device to provide the link quality metrics in a trigger-based protocol data unit (TB PPDU).

In some implementations, the method may include determining that the subsequent packet will be a beamformed transmission. The method may include adjusting a format of the link adaptation test packet when the subsequent packet will be the beamformed transmission such that the link adaptation test packet is formatted to aid measurement of beamforming characteristics of the wireless channel.

In some implementations, the method may include transmitting a null data packet announcement (NDPA) to indicate that a combined null data packet (NDP) that includes the link adaptation test packet will be used for beamforming estimation and link adaptation. The method may include transmitting the combined NDP from the first WLAN device to the second WLAN device. The method may include receiving a response to the combined NDP. The response may include beamforming feedback based on the beamforming estimation and link adaptation feedback based on the link quality metrics of the wireless channel.

In some implementations, the method may include determining that the subsequent packet will be a beamformed transmission. The method may include, before communicating the link adaptation test packet: transmitting a traditional null data packet announcement (NDPA) from the first WLAN device to the second WLAN device and transmitting a traditional null data packet (NDP) from the first WLAN device to the second WLAN device. The NDP may be usable by the second WLAN device to determine beamforming feedback. The method may include receiving a beamform (BF) report packet including the beamforming feedback from second WLAN device. The method may include transmitting the link adaptation test packet using a beamforming configuration based on the beamforming feedback.

In some implementations, the link adaptation test packet is received by the first WLAN device from the second WLAN device. In some implementations, obtaining the link quality metrics includes measuring the link quality metrics based on the link adaptation test packet.

In some implementations, the method may include transmitting a link adaptation request packet that includes identifiers associated with the second WLAN device and a third WLAN device. The link adaptation request packet may be configured to cause the second WLAN device and the third WLAN device to concurrently provide link adaptation test packets to the first WLAN device. The method may include receiving the link adaptation test packets from the second WLAN device and the third WLAN device via the wireless channel. The method may include determining a first selected transmission rate option for the second WLAN device and a second selected transmission rate option for the third WLAN based, at least in part, on the link adaptation test packets.

In some implementations, communicating the subsequent packet includes transmitting the subsequent packet as a multi-user (MU) DL transmission. The MU DL transmission may include a first portion for the second WLAN device modulated according to the first selected transmission rate option and may include a second portion for the third WLAN device modulated according to the second selected transmission rate option.

In some implementations, the method may include transmitting a trigger frame to cause the second WLAN device and the third WLAN device to transmit a multi-user (MU) uplink (UL) transmission. The trigger frame may include indications of the first selected transmission rate option for the second WLAN device to use in the MU UL transmission and the second selected transmission rate option for the third WLAN device to use in the in the MU UL transmission.

In some implementations, the MU UL transmission is formatted according to a multi-user (MU) multiple-input-multiple-output (MIMO) transmission or an orthogonal frequency division multiple access (OFDMA) transmission.

Another innovative aspect of the subject matter described in this disclosure can be implemented as a method performed by a first station (STA) of a WLAN. The method may include receiving a link adaptation test packet from an access point (AP) of the WLAN via a wireless channel. The link adaptation test packet may include one or more test portions formatted to aid measurement of link quality metrics associated with different transmission rate options of the wireless channel. The method may include measuring the link quality metrics associated with the different transmission rate options based on the link adaptation test packet. The method may include transmitting link adaptation feedback to the AP based, at least in part, on the link quality metrics. The method may include receiving a subsequent packet formatted according to a transmission rate option selected by the AP based on the link adaptation feedback.

In some implementations, the method may include receiving a link adaptation null data packet announcement (LA-NDPA) before receiving the link adaptation test packet. The LA-NDPA may instruct the first STA to measure the link quality metrics.

In some implementations, the method may include receiving a trigger frame. The link adaptation feedback may be transmitted in response to the trigger frame.

In some implementations, the link adaptation test packet is a multi-user (MU) multiple-input-multiple-output (MIMO) transmission, or an orthogonal frequency division multiple access (OFDMA) transmission formatted to solicit link adaptation feedback from the first STA and a second STA of the WLAN.

Another innovative aspect of the subject matter described in this disclosure can be implemented as an apparatus of a first WLAN device. The apparatus may include at least one modem configured to communicate a link adaptation test packet between the first WLAN device and a second WLAN device via a wireless channel. The link adaptation test packet may include one or more test portions formatted to aid measurement of link quality metrics associated with different transmission rate options of the wireless channel. The apparatus may include at least one processor communicatively coupled with the at least one modem and configured to obtain the link quality metrics associated with the different transmission rate options based on the link adaptation test packet. The at least one processor may be configured to select a selected transmission rate option for transmission of a subsequent packet between the first WLAN device and the second WLAN device via the wireless channel based, at least in part, on the link quality metrics. The at least one modem may be configured to communicate the subsequent packet using the selected transmission rate option.

In some implementations, the link adaptation test packet is output from the first WLAN device to the second WLAN device. The at least one processor may be configured to obtain the link quality metrics from feedback information obtained by the at least one modem from the second WLAN device in response to the link adaptation test packet.

In some implementations, the link adaptation test packet is part of a message sequence defined for a link adaptation protocol. The at least one processor may be configured to select the message sequence from among a plurality of message sequences based on a transmission type for the subsequent packet, the plurality of message sequences including different message sequences when the transmission type is one of a group consisting of a single user (SU) transmission, an orthogonal frequency division multiple access (OFDMA) transmission, and a multi-user (MU) multiple-input-multiple-output (MU-MIMO) transmission type. The at least one processor may be configured to cause the at least one modem to format the link adaptation test packet based, at least in part on the selected message sequence.

In some implementations, the at least one processor is further configured to determine that the subsequent packet will be a beamformed transmission and cause the at least one modem to adjust a format of the link adaptation test packet when the subsequent packet will be the beamformed transmission such that the link adaptation test packet is formatted to aid measurement of beamforming characteristics of the wireless channel.

In some implementations, the at least one modem may be configured to output a null data packet announcement (NDPA) for transmission to the second WLAN to indicate that a combined null data packet (NDP) that includes the link adaptation test packet will be used for beamforming estimation and link adaptation. The at least one modem may be configured to output the combined NDP for transmission from the first WLAN device to the second WLAN device via the wireless channel. The at least one modem may be configured to obtain a response to the combined NDP. The response may include beamforming feedback based on the beamforming estimation and link adaptation feedback based on the link quality metrics of the wireless channel.

In some implementations, the apparatus may include at least one transceiver coupled to the at least one modem. The apparatus may include a plurality of antennas coupled to the at least one transceiver to wirelessly transmit signals output from the at least one transceiver. The apparatus may include a housing that encompasses the at least one modem, the at least one processor, the at least one transceiver and at least a portion of the plurality of antennas.

Another innovative aspect of the subject matter described in this disclosure can be implemented as an apparatus of a second WLAN device. The apparatus may include at least one modem configured to obtain a link adaptation test packet from an access point (AP) of the WLAN via a wireless channel. The link adaptation test packet may include one or more test portions formatted to aid measurement of link quality metrics associated with different transmission rate options of the wireless channel. The apparatus may include at least one processor communicatively coupled with the at least one modem and configured to measure the link quality metrics associated with the different transmission rate options based on the link adaptation test packet. The at least one modem may be configured to output link adaptation feedback for transmission to the AP based, at least in part, on the link quality metrics. The at least one modem may be configured to obtain a subsequent packet from the AP via the wireless channel, the subsequent packet formatted according a transmission rate option selected by the AP based on the link adaptation feedback.

In some implementations, the apparatus may include at least one transceiver coupled to the at least one modem. The apparatus may include a plurality of antennas coupled to the at least one transceiver to wirelessly transmit signals output from the at least one transceiver. The apparatus may include a housing that encompasses the at least one modem, the at least one processor, the at least one transceiver and at least a portion of the plurality of antennas.

Another innovative aspect of the subject matter described in this disclosure can be implemented as a method performed by a first WLAN device. The method may include determining data to send from a first WLAN device to a second WLAN device via a wireless channel. The method may include, before sending the data, outputting a first packet for transmission from the first WLAN device to the second WLAN device via the wireless channel. The first packet may be formatted for the second WLAN device to determine link quality metrics of the wireless channel. The method may include receiving, from the second WLAN device, feedback information based on the link quality metrics of the wireless channel. The feedback information may be usable by the first WLAN device to determine an MCS (or other transmission rate option) to encode and modulate a subsequent packet to the second WLAN device via the wireless channel. The method may include outputting at least part of the data in the subsequent packet using the selected MCS.

In some implementations, the first packet may be a fast rate adaptation (FRA) test packet. The feedback information may be link adaptation feedback that is specific to MCS selection.

In some implementations, the feedback information includes a field that indicates the selected MCS that was selected by the second WLAN device based on link quality metrics.

In some implementations, the feedback information includes the link quality metrics. The method may include determining, by the first WLAN device, the selected MCS based on the link quality metrics.

In some implementations, the first packet may be formatted as a MIMO transmission that includes one or more portions for SINR estimation, and the feedback information may be based on the SINR estimation.

In some implementations, the first packet includes a plurality of portions modulated using a corresponding plurality of MCS options, at least a first portion modulated using a first MCS and a second portion modulated using a second MCS. The feedback information may be based on the plurality of MCS options.

In some implementations, the first packet may be part of a fast rate adaptation (FRA) message sequence.

In some implementations, the first packet may be a LA-NDP and the feedback information may be received in a LA-FB packet.

In some implementations, the method may include determining a transmission type for the subsequent packet from among a plurality of transmission types that includes an SU transmission, an OFDMA transmission, and an MU-MIMO transmission type. The method may include selecting the link adaptation sequence from among a plurality of link adaptation sequences that correspond to the plurality of transmission types.

In some implementations, the method may include determining whether the subsequent packet will be a beamformed transmission of the determined transmission type. The method may include adjusting the link adaptation sequence based on whether the subsequent packet will be the beamformed transmission.

In some implementations, the link adaptation sequence includes the first WLAN device outputting an LA-NDPA before outputting the LA-NDP.

In some implementations, the LA-NDPA includes instructions for the second WLAN device to send the feedback information.

In some implementations, the LA-NDPA includes an indicator that identifies the link adaptation sequence.

In some implementations, the LA-FB packet includes an array of link quality metrics based on subsets of the LA-NDP or based on subsets of bandwidth for the wireless channel.

In some implementations, the first packet may be part of a fast rate adaptation (link adaptation) sequence. The link adaptation sequence may include outputting a LA-NDPA from the first WLAN device to the second WLAN device. The link adaptation sequence may include outputting the first packet from the first WLAN device to the second WLAN device. The first packet may be an LA-NDP. The link adaptation sequence may include receiving an LA-FB packet including the feedback information from second WLAN device. The link adaptation sequence may include outputting the subsequent packet. The link adaptation sequence may include receiving a block acknowledgement (BA) feedback message from the second WLAN device. The BA feedback message may be usable by the first WLAN device to determine whether to retransmit at least part of the data in the subsequent packet.

In some implementations, the link adaptation sequence permits piggybacked rate adaptation information. The link adaptation sequence may further include including an additional LA-NDP as part of the subsequent packet. The link adaptation sequence may include receiving an additional LA-FB as part of the BA feedback message from the second WLAN device. In some implementations, the additional LA-FB may be usable by the first WLAN device to determine a new selected MCS to modulate a next packet after the subsequent packet. The link adaptation sequence may include outputting the next packet using the new selected MCS.

In some implementations, the link adaptation sequence may be for use with a DL OFDMA transmission. The link adaptation sequence may include, after outputting the LA-NDP, outputting a trigger frame to cause at least the second WLAN device to send the LA-FB. The LA-FB may be a TB PPDU. In some implementations, outputting the subsequent packet includes outputting a DL OFDMA transmission that includes the subsequent packet.

In some implementations, the link adaptation sequence may further include outputting a BA request (BAR) packet to cause at least the second WLAN device to send the BA feedback message.

In some implementations, the link adaptation sequence permits piggybacked rate adaptation information. The link adaptation sequence may further include including an additional LA-NDP as part of the DL OFDMA transmission and outputting a BAR packet to cause at least the second WLAN device to send the BA feedback message and the LA-FB. The link adaptation sequence may include eceiving an additional LA-FB as part of the BA feedback message from the second WLAN device. The additional LA-FB may be usable by the first WLAN device to determine a new selected MCS to modulate a next packet after the subsequent packet. The link adaptation sequence may include outputting the next packet as a next DL OFDMA transmission using the new selected MCS.

In some implementations, the method includes determining to beamform the subsequent packet. The method may include, before the link adaptation sequence, performing a beamform determination sequence. The beamforming determination sequence may include outputting a traditional NDPA from the first WLAN device to the second WLAN device. The beamforming determination sequence may include outputting a traditional NDP from the first WLAN device to the second WLAN device, where the NDP may be usable by the second WLAN device to determine beamforming feedback. The beamforming determination sequence may include receiving a beamform (BF) report packet including the beamforming feedback from second WLAN device. The beamforming determination sequence may include determining a beamforming configuration based on the beamforming feedback. The beamforming configuration may be used for the LA-NDPA, the LA-NDP, and the subsequent packet.

In some implementations, the method may include determining to beamform the subsequent packet. The method may include performing the link adaptation sequence in combination with a beamform determination sequence. The link adaptation sequence in combination with the beamform determination sequence may include outputting a combined NDPA to indicate that a combined NDP will be used for beamforming estimation and link quality metrics. The link adaptation sequence in combination with the beamform determination sequence may include outputting the combined NDP from the first WLAN device to the second WLAN device. The combined NDP may be usable by the second WLAN device to determine beamforming feedback and the link quality metrics. The link adaptation sequence in combination with the beamform determination sequence may include receiving a response to the combined NDP. The response may include the beamforming feedback and the feedback information based on the link quality metrics of the wireless channel. The link adaptation sequence in combination with the beamform determination sequence may include determining a beamforming configuration based on the beamforming feedback and the selected MCS based on the link quality metrics. The beamforming configuration and the selected MCS may be used for the subsequent packet.

In some implementations, the link adaptation sequence may be for use with a DL MU-MIMO transmission and beamforming. The beamform determination sequence may include, after outputting the traditional NDP, outputting a trigger frame to cause at least the second WLAN device to send the BF report packet. Outputting the subsequent packet may include outputting a DL MU-MIMO transmission that includes the subsequent packet.

In some implementations, the first WLAN device may be an AP and the second WLAN device may be a STA, such that the subsequent packet is a downlink transmission.

In some implementations, the first WLAN device may be a STA and the second WLAN device may be an AP, such that the subsequent packet is an uplink transmission.

Another innovative aspect of the subject matter described in this disclosure can be implemented as a method performed by an apparatus of an AP. The method may include determining that a first STA has data to send from the first STA to the AP via a wireless channel. The method may include, before causing the STA to send the data, outputting a fast rate adaptation (FRA) request packet. The link adaptation request packet may be configured to cause the first STA to send a link adaptation test packet to the AP. The method may include receiving the link adaptation test packet from the first STA via the wireless channel. The link adaptation test packet may be formatted for the AP to determine link quality metrics of the wireless channel. The method may include determining a first selected MCS (or other transmission rate option) for the first STA to use for an uplink transmission that includes the data, the first selected MCS based on the link quality metrics of the wireless channel. The method may include outputting a trigger frame configured to cause the first STA to use the first selected MCS in the uplink transmission that includes the data. The trigger frame may prompt the first STA to send the uplink transmission to the AP.

In some implementations, the uplink transmission may be an OFDMA transmission that includes the data from the first STA as well as other data from a second STA.

In some implementations, the link adaptation request packet may be formatted as a LA-NDPR and the link adaptation test packet may be formatted as an LA-NDP.

In some implementations, the link adaptation request packet indicates which STAs to send link adaptation test packets.

In some implementations, the method may include determining that a second STA has data to send from the second STA to the AP via the wireless channel. The method may include including in the link adaptation request packet, identifiers associated with the first STA and the second STA. The link adaptation request packet may be configured to cause the first STA and the second STA to concurrently send link adaptation test packets to the AP. The method may include receiving the link adaptation test packets from the first STA and the second STA via the wireless channel. The method may include determining the first selected MCS for the first STA to use for a concurrent uplink transmission and a second selected MCS for the second STA to use for the concurrent uplink transmission, the first selected MCS and the second selected MCS based on the link adaptation test packets. The method may include including indications of the first selected MCS and the second selected MCS in the trigger frame to cause the first STA to use the first selected MCS for the concurrent uplink transmission and to cause the second STA to use the second selected MCS for the concurrent uplink transmission. The method may include receiving data from the first STA and the second STA in the concurrent uplink transmission.

In some implementations, the concurrent uplink transmission may be formatted according to a MU-MIMO transmission.

In some implementations, the concurrent uplink transmission may be formatted according to an OFDMA transmission.

Another innovative aspect of the subject matter described in this disclosure can be implemented as an apparatus. The apparatus may include a modem and at least one processor communicatively coupled with the at least one modem. The processor, in conjunction with the modem, may be configured to perform any one of the above-mentioned methods or features described herein.

Another innovative aspect of the subject matter described in this disclosure can be implemented as a computer-readable medium having stored therein instructions which, when executed by a processor, causes the processor to perform any one of the above-mentioned methods or features described herein.

Another innovative aspect of the subject matter described in this disclosure can be implemented as a system having means for implementing any one of the above-mentioned methods or features described herein.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication by a first wireless local area network (WLAN) device, comprising:
    communicating a link adaptation test packet between the first WLAN device and a second WLAN device via a wireless channel, the link adaptation test packet including a first test portion modulated with a first modulation and coding scheme (MCS) and a second test portion modulated with a second MCS, wherein the first MCS is different from the second MCS;
    obtaining a first link quality metric associated with the first test portion of the link adaptation test packet modulated with the first MCS and a second link quality metric associated with the second test portion of the link adaptation test packet modulated with the second MCS; and
    communicating a subsequent packet between the first WLAN device and the second WLAN device via the wireless channel using the first MCS or the second MCS based at least in part on the first link quality metric and the second link quality metric.

2. The method of claim 1, wherein communicating the link adaptation test packet includes transmitting the link adaptation test packet from the first WLAN device to the second WLAN device, and wherein obtaining the first link quality metric and the second link quality metric includes receiving feedback information from the second WLAN device in response to the link adaptation test packet.

3. The method of claim 2, wherein the link adaptation test packet is formatted as a link adaptation null data packet (LA-NDP) and the feedback information is received in a link adaptation feedback (LA-FB) packet.

4. The method of claim 2, wherein the feedback information includes a field that indicates a modulation and coding scheme (MCS) option that was selected by the second WLAN device based on the first link quality metric and the second link quality metric and wherein the communicating the subsequent packet using the first MCS or the second MCS is based on the MCS option selected by the second WLAN device.

5. The method of claim 1, wherein the link adaptation test packet is part of a message sequence defined for a link adaptation protocol.

6. The method of claim 5, further comprising:
    selecting the message sequence from among a plurality of message sequences based on a transmission type for the subsequent packet, the plurality of message sequences including different message sequences when the transmission type is one of a group consisting of a single user (SU) transmission, an orthogonal frequency division multiple access (OFDMA) transmission, and a multi-user (MU) multiple-input-multiple-output (MU-MIMO) transmission type; and
    formatting the link adaptation test packet based, at least in part on the selected message sequence.

7. The method of claim 6, wherein the selected message sequence includes the first WLAN device transmitting a link adaptation null data packet announcement (LA-NDPA) or link adaptation feedback request before communicating the link adaptation test packet, the LA-NDPA or link adaptation feedback request formatted to cause the second WLAN device to provide the first link quality metric and the second link quality metric regarding the link adaptation test packet.

8. The method of claim 1, wherein the link adaptation test packet is part of a link adaptation message sequence that includes:
    transmitting the link adaptation test packet as a piggybacked link adaptation portion of a data carrying packet from the first WLAN device to the second WLAN device; and
    receiving the first link quality metric and the second link quality metric as part of a block acknowledgement (BA) feedback message from the second WLAN device.

9. The method of claim 8, further comprising:
    communicating a plurality of link adaptation test packets in a corresponding plurality of data carrying packets from the first WLAN device to the second WLAN device; and
    selecting the first MCS or the second MCS based on feedback from the second WLAN device in response to one or more of the link adaptation test packets.

10. The method of claim 1, wherein communicating the link adaptation test packet includes:
    transmitting the link adaptation test packet from the first WLAN device to the second WLAN device as a downlink (DL) orthogonal frequency division multiple access (OFDMA) transmission; and
    transmitting a trigger frame to cause at least the second WLAN device to provide the first link quality metric and the second link quality metric in a trigger-based physical layer convergence protocol (PLCP) protocol data unit (TB PPDU).

11. The method of claim 1, further comprising:
    determining that the subsequent packet will be a beamformed transmission; and
adjusting a format of the link adaptation test packet when the subsequent packet will be the beamformed transmission such that the link adaptation test packet is formatted to aid measurement of beamforming characteristics of the wireless channel.

12. The method of claim 11, further comprising:
transmitting a null data packet announcement (NDPA) to indicate that a combined null data packet (NDP) that includes the link adaptation test packet will be used for a beamforming estimation and link adaptation;
transmitting the combined NDP from the first WLAN device to the second WLAN device; and
receiving a response to the combined NDP, wherein the response includes beamforming feedback based on the beamforming estimation and link adaptation feedback based on the first link quality metric and the second link quality metric of the wireless channel.

13. The method of claim 1, further comprising:
determining that the subsequent packet will be a beamformed transmission;
before communicating the link adaptation test packet:
transmitting a traditional null data packet announcement (NDPA) from the first WLAN device to the second WLAN device,
transmitting a traditional null data packet (NDP) from the first WLAN device to the second WLAN device, wherein the NDP is usable by the second WLAN device to determine beamforming feedback, and
receiving a beamform (BF) report packet including the beamforming feedback from second WLAN device; and
transmitting the link adaptation test packet using a beamforming configuration based on the beamforming feedback.

14. The method of claim 1, wherein the link adaptation test packet is received by the first WLAN device from the second WLAN device, and wherein obtaining the first link quality metric and the second link quality metric includes measuring the first link quality metric and the second link quality metric based on the link adaptation test packet.

15. The method of claim 14, further comprising:
transmitting a link adaptation request packet that includes identifiers associated with the second WLAN device and a third WLAN device, wherein the link adaptation request packet is configured to cause the second WLAN device and the third WLAN device to concurrently provide link adaptation test packets to the first WLAN device;
receiving the link adaptation test packets from the second WLAN device and the third WLAN device via the wireless channel; and
determining the first MCS or the second MCS as a first selected transmission rate option for the second WLAN device and the first MCS or the second MCS as a second selected transmission rate option for the third WLAN device based, at least in part, on the link adaptation test packets.

16. The method of claim 15, wherein communicating the subsequent packet includes:
transmitting the subsequent packet as a multi-user (MU) DL transmission that includes a first portion, for the second WLAN device, modulated according to the first selected transmission rate option and further includes a second portion, for the third WLAN device, modulated according to the second selected transmission rate option.

17. The method of claim 15, further comprising:
transmitting a trigger frame to cause the second WLAN device and the third WLAN device to transmit a multi-user (MU) uplink (UL) transmission, wherein the trigger frame includes indications of the first selected transmission rate option for the second WLAN device to use in the MU UL transmission and the second selected transmission rate option for the third WLAN device to use in the MU UL transmission.

18. The method of claim 17, wherein the MU UL transmission is formatted according to a multi-user (MU) multiple-input-multiple-output (MIMO) transmission or an orthogonal frequency division multiple access (OFDMA) transmission.

19. A method for wireless communication by a first station (STA) of a wireless local area network (WLAN), comprising:
receiving a link adaptation test packet from an access point (AP) of the WLAN via a wireless channel, the link adaptation test packet including a first test portion modulated with a first modulation and coding scheme (MCS) and a second test portion modulated with a second MCS, wherein the first MCS is different from the second MCS;
measuring a first link quality metric associated with the first test portion of the link adaptation test packet modulated with the first MCS and a second link quality metric associated with the second test portion of the link adaptation test packet modulated with the second MCS;
transmitting link adaptation feedback to the AP based, at least in part, on the first link quality metric and the second link quality metric; and
receiving a subsequent packet formatted according to a transmission rate option selected by the AP based on the link adaptation feedback.

20. The method of claim 19, further comprising:
receiving a link adaptation null data packet announcement (LA-NDPA) before receiving the link adaptation test packet, wherein the LA-NDPA instructs the first STA to measure the first link quality metric and the second link quality metric.

21. The method of claim 20, further comprising:
receiving a trigger frame, wherein the link adaptation feedback is transmitted in response to the trigger frame.

22. The method of claim 19, wherein the link adaptation test packet is a multi-user (MU) multiple-input-multiple-output (MIMO) transmission or an orthogonal frequency division multiple access (OFDMA) transmission formatted to solicit link adaptation feedback from the first STA and a second STA of the WLAN.

23. An apparatus of a first wireless local area network (WLAN) device, comprising:
at least one modem configured to communicate a link adaptation test packet between the first WLAN device and a second WLAN device via a wireless channel, the link adaptation test packet including a first test portion modulated with a first modulation and coding scheme (MCS) and a second test portion modulated with a second MCS, wherein the first MCS is different from the second MCS;
at least one processor communicatively coupled with the at least one modem and configured to:
obtain a first link quality metric associated with the first test portion of the link adaptation test packet modulated with the first MCS and a second link quality metric associated with the second test portion of the link adaptation test packet modulated with the second MCS, and
the at least one modem configured to communicate a subsequent packet between the first WLAN device and the second WLAN device via the wireless channel using the first MCS or the second MCS based at least in part on the first link quality metric and the second link quality metric.

24. The apparatus of claim 23, wherein the link adaptation test packet is output from the first WLAN device to the second WLAN device, and wherein the at least one processor is configured to obtain the first link quality metric and the second link quality metric from feedback information obtained by the at least one modem from the second WLAN device in response to the link adaptation test packet.

25. The apparatus of claim 23,
wherein the link adaptation test packet is part of a message sequence defined for a link adaptation protocol,
wherein the at least one processor is configured to:
select the message sequence from among a plurality of message sequences based on a transmission type for the subsequent packet, the plurality of message sequences including different message sequences when the transmission type is one of a group consisting of a single user (SU) transmission, an orthogonal frequency division multiple access (OFDMA) transmission, and a multi-user (MU) multiple-input-multiple-output (MU-MIMO) transmission type; and
cause the at least one modem to format the link adaptation test packet based, at least in part on the selected message sequence.

26. The apparatus of claim 23, wherein the at least one processor is further configured to:
determine that the subsequent packet will be a beamformed transmission; and
cause the at least one modem to adjust a format of the link adaptation test packet when the subsequent packet will be the beamformed transmission such that the link adaptation test packet is formatted to aid measurement of beamforming characteristics of the wireless channel.

27. The apparatus of claim 23, further comprising:
the at least one modem further configured to:
output a null data packet announcement (NDPA) for transmission to the second WLAN device to indicate that a combined null data packet (NDP) that includes the link adaptation test packet will be used for beamforming estimation and link adaptation;
output the combined NDP for a transmission from the first WLAN device to the second WLAN device via the wireless channel; and
obtain a response to the combined NDP, wherein the response includes beamforming feedback based on the beamforming estimation and link adaptation feedback based on the first link quality metric and the second link quality metric of the wireless channel.

28. The apparatus of claim 23, further comprising:
at least one transceiver coupled to the at least one modem;
a plurality of antennas coupled to the at least one transceiver to wirelessly transmit signals output from the at least one transceiver; and
a housing that encompasses the at least one modem, the at least one processor, the at least one transceiver and at least a portion of the plurality of antennas.

29. An apparatus of a second wireless local area network (WLAN) device, comprising:
at least one modem configured to obtain a link adaptation test packet from an access point (AP) of the second WLAN via a wireless channel, the link adaptation test packet including a first test portion modulated with a first modulation and coding scheme (MCS) and a second test portion modulated with a second MCS, wherein the first MCS is different from the second MCS;
at least one processor communicatively coupled with the at least one modem and configured to measure a first link quality metric associated with the first test portion of the link adaptation test packet modulated with the first MCS and a second link quality metric associated with the second test portion of the link adaptation test packet modulated with the second MCS;
the at least one modem configured to output link adaptation feedback for transmission to the AP based, at least in part, on the first link quality metric and the second link quality metric; and
the at least one modem configured to obtain a subsequent packet from the AP via the wireless channel, the subsequent packet formatted according the first MCS or the second MCS selected by the AP based on the link adaptation feedback.

30. The apparatus of claim 29, further comprising:
at least one transceiver coupled to the at least one modem;
a plurality of antennas coupled to the at least one transceiver to wirelessly transmit signals output from the at least one transceiver; and
a housing that encompasses the at least one modem, the at least one processor, the at least one transceiver and at least a portion of the plurality of antennas.

* * * * *